US007696877B2

(12) United States Patent
Barnes et al.

(10) Patent No.: US 7,696,877 B2
(45) Date of Patent: Apr. 13, 2010

(54) METHOD, APPARATUS AND ARTICLE FOR DETECTION OF TRANSPONDER TAGGED OBJECTS, FOR EXAMPLE DURING SURGERY

(75) Inventors: Bruce E. Barnes, Escondido, CA (US); David A. Poirier, Escondido, CA (US); William A. Blair, San Diego, CA (US)

(73) Assignee: RF Surgical Systems, Inc., Bellevue, WA (US)

( * ) Notice: Subject to any disclaimer, the term of this patent is extended or adjusted under 35 U.S.C. 154(b) by 358 days.

(21) Appl. No.: 11/743,104

(22) Filed: May 1, 2007

(65) Prior Publication Data

US 2008/0272913 A1 Nov. 6, 2008

(51) Int. Cl.
*G08B 13/14* (2006.01)
*G08B 21/00* (2006.01)
*H04B 5/00* (2006.01)

(52) U.S. Cl. .................... 340/572.1; 340/635; 340/657; 455/41.1; 455/41.2; 128/901

(58) Field of Classification Search ....................... None
See application file for complete search history.

(56) References Cited

U.S. PATENT DOCUMENTS

| | | | | |
|---|---|---|---|---|
| 3,422,816 | A | 1/1969 | Robinson et al. | 128/296 |
| 3,587,583 | A | 6/1971 | Greenberg | 128/296 |
| 4,114,601 | A | 9/1978 | Abels | 128/1 |
| 4,193,405 | A | 3/1980 | Abels | 128/296 |
| 4,422,548 | A | 12/1983 | Cheesman et al. | 206/370 |
| 4,658,818 | A | 4/1987 | Miller, Jr. et al. | 128/303.1 |
| 4,681,111 | A | 7/1987 | Silvian | 128/419 |
| 4,893,118 | A | 1/1990 | Lewiner et al. | 340/825.54 |
| 4,992,675 | A * | 2/1991 | Conner et al. | 327/72 |
| 5,031,642 | A | 7/1991 | Nosek | 128/906 |
| 5,057,095 | A | 10/1991 | Fabian | 604/362 |
| 5,105,829 | A | 4/1992 | Fabian et al. | 128/899 |
| 5,107,862 | A | 4/1992 | Fabian et al. | 128/899 |
| 5,188,126 | A | 2/1993 | Fabian et al. | 128/899 |
| 5,190,059 | A | 3/1993 | Fabian et al. | 128/899 |
| 5,235,326 | A | 8/1993 | Beigel et al. | |
| 5,258,742 | A | 11/1993 | Soldevila Domingo et al. | 340/568 |

(Continued)

FOREIGN PATENT DOCUMENTS

WO 2006/060781 A1 6/2006

OTHER PUBLICATIONS

U.S. Appl. No. 60/811,376, filed Jun. 6, 2006, Blair et al.

(Continued)

*Primary Examiner*—Julie Lieu
(74) *Attorney, Agent, or Firm*—Seed IP Law Group PLLC

(57) ABSTRACT

The presence or absence of objects is determined by interrogating or exciting transponders coupled to the objects using pulsed wide band frequency signals. Ambient or background noise is evaluated and a threshold adjusted based on the level of noise. Adjustment may be based on multiple noise measurements or samples. Noise detection may be limited, with emphasis placed on interrogation to increase the signal to noise ratio. Match filtering may be employed. Appropriate acts may be taken if detected noise is out of defined limits of operation, for example shutting down interrogation and/or providing an appropriate indication.

31 Claims, 20 Drawing Sheets

U.S. PATENT DOCUMENTS 5,329,944 A 7/1994 Fabian et al. ................ 128/899
5,353,011 A 10/1994 Wheeler et al. ............. 340/572
5,446,447 A 8/1995 Carney et al. ............... 340/572
5,456,718 A 10/1995 Szymaitis
5,482,036 A * 1/1996 Diab et al. .................. 600/364
5,629,498 A 5/1997 Pollock et al. ................ 177/15
5,650,596 A 7/1997 Morris et al. ............ 177/25.13
5,664,582 A 9/1997 Szymaitis
5,923,001 A 7/1999 Morris et al. ............... 177/245
5,928,151 A 7/1999 Hossack et al. ............. 600/443
6,026,818 A 2/2000 Blair et al. .................. 128/899
6,211,666 B1 4/2001 Acker .................... 324/207.17
6,215,437 B1 * 4/2001 Schurmann et al. ........... 342/42
6,223,137 B1 4/2001 McCay et al. ............... 702/184
6,270,460 B1 8/2001 McCartan et al. ........... 600/459
6,349,234 B2 2/2002 Pauly et al. .................... 607/60
6,359,562 B2 3/2002 Rubin ..................... 340/572.3
6,366,206 B1 4/2002 Ishikawa et al. ......... 340/573.1
6,401,722 B1 6/2002 Krag .......................... 128/898
6,557,752 B1 5/2003 Yacoob ...................... 235/375
6,588,661 B2 7/2003 Degrauwe et al. ........... 235/382
6,632,216 B2 10/2003 Houzego et al. ......... 604/890.1
6,633,226 B1 10/2003 Nysen ....................... 340/10.1
6,641,039 B2 11/2003 Southard .................... 235/385
6,648,223 B2 11/2003 Boukhny et al. ............ 235/385
6,650,240 B2 11/2003 Lee et al. ................. 340/572.1
6,696,954 B2 2/2004 Chung ..................... 340/572.7
6,734,795 B2 5/2004 Price ....................... 340/572.1
6,777,623 B2 8/2004 Ballard .................... 177/25.13
6,786,405 B2 9/2004 Wiedenhoefer ............. 235/385
6,812,824 B1 * 11/2004 Goldinger et al. .......... 340/10.1
6,812,842 B2 11/2004 Dimmer .................. 340/572.4
6,822,570 B2 11/2004 Dimmer et al. .......... 340/572.1
6,838,990 B2 1/2005 Dimmer .................. 340/572.4
6,861,954 B2 3/2005 Levin ...................... 340/572.1
6,879,300 B2 4/2005 Rochelle et al. ............. 343/867
6,909,366 B1 6/2005 Marsh et al. ................ 340/505
6,977,504 B2 12/2005 Wright et al. ............... 324/326
6,998,541 B2 2/2006 Morris et al. ................. 177/15
7,001,366 B2 2/2006 Ballard ....................... 604/317
7,019,650 B2 3/2006 Volpi et al.
7,026,924 B2 4/2006 Gegrauwe et al. ........... 340/523
7,026,927 B2 4/2006 Wright et al. .......... 340/539.12
7,098,793 B2 8/2006 Chung ..................... 340/572.1
7,098,866 B2 8/2006 Desjeux et al. ............. 343/895
7,135,978 B2 11/2006 Gisselberg et al.
7,158,030 B2 1/2007 Chung ..................... 340/572.1
7,158,754 B2 1/2007 Anderson .................. 455/41.1
7,160,258 B2 1/2007 Imran et al. ................. 600/593
7,176,798 B2 2/2007 Dimmer et al. .......... 340/572.1
7,256,695 B2 8/2007 Hamel et al. ............. 340/572.1
7,256,696 B2 8/2007 Levin ...................... 340/572.1
7,268,684 B2 9/2007 Tethrake et al. .......... 340/572.1
7,299,981 B2 11/2007 Hickle et al. ................ 235/385
D557,421 S 12/2007 Fleck et al. ................ D24/185
7,319,396 B2 1/2008 Homanfar et al. ........ 340/572.1
7,319,397 B2 1/2008 Chung et al. ............. 340/572.4
7,325,723 B2 2/2008 Desjeux ...................... 235/380
7,342,497 B2 3/2008 Chung et al. ............. 340/572.1
7,362,228 B2 4/2008 Nycz et al. ............... 340/572.1
7,382,255 B2 6/2008 Chung ..................... 340/572.1
7,397,364 B2 7/2008 Govari .................. 340/539.12
7,423,535 B2 9/2008 Chung et al. ............. 340/572.4
7,492,257 B2 2/2009 Tethrake et al. .......... 340/572.1
7,508,303 B2 3/2009 Capowski et al. ........... 340/506
7,513,425 B2 4/2009 Chung ........................ 235/385
2002/0032435 A1 3/2002 Levin ............................ 606/1
2002/0165587 A1 * 11/2002 Zhang et al. .................. 607/28
2003/0004411 A1 1/2003 Govari et al. ............... 600/424
2003/0105394 A1 6/2003 Fabian et al.
2004/0129279 A1 7/2004 Fabian et al.
2004/0137844 A1 * 7/2004 Desjeux et al. ............ 455/41.1
2004/0250819 A1 12/2004 Blair et al.
2005/0049564 A1 3/2005 Fabian
2006/0106368 A1 5/2006 Miller et al.
2006/0187044 A1 * 8/2006 Fabian et al. ............. 340/572.1
2006/0202827 A1 9/2006 Volpi et al.
2006/0235488 A1 10/2006 Nycz et al. .................... 607/60
2006/0241396 A1 10/2006 Fabian et al. ................ 600/424
2006/0241399 A1 10/2006 Fabian ........................ 600/424
2007/0004994 A1 1/2007 Sherman ...................... 602/26
2007/0005141 A1 1/2007 Sherman .................. 623/18.12
2007/0109099 A1 * 5/2007 Raphaeli et al. ............ 340/10.2
2007/0239289 A1 10/2007 Cambre et al. ................ 700/64
2007/0265690 A1 11/2007 Lichtenstein et al. ........ 607/116
2007/0285249 A1 12/2007 Blair et al. ............... 340/572.3
2008/0007411 A1 1/2008 Levin ...................... 340/572.1
2008/0051746 A1 2/2008 Shen-Gunther ............. 604/362
2008/0132860 A1 6/2008 Smith et al. ................. 604/362
2008/0204245 A1 8/2008 Blair et al. ............... 340/572.1
2008/0231452 A1 9/2008 Levin ...................... 340/572.1
2008/0237341 A1 10/2008 Fleck et al. ................. 235/385
2008/0238677 A1 10/2008 Blair et al. ............... 340/572.1
2008/0243404 A1 * 10/2008 Banhegyesi .................. 702/61
2008/0281190 A1 11/2008 Petcavich et al. ........... 600/424
2008/0296373 A1 12/2008 Zmood et al. ............... 235/385

OTHER PUBLICATIONS

Barnes et al., "Design for a FET Based 1 MHz, 10 kV Pulse Generator," Pulsed Power Conference, Digest of Technical Papers, Tenth IEEE International, 2:1335-1340, 1995.
U.S. Appl. No. 12/472,199, Blair.
U.S. Appl. No. 12/473,059, Barnes et al.
U.S. Appl. No. 61/109,104, Blair et al.
U.S. Appl. No. 61/222,443, Blair et al.
U.S. Appl. No. 61/222,847, Blair et al.

* cited by examiner

METHOD, APPARATUS AND ARTICLE FOR DETECTION OF TRANSPONDER TAGGED OBJECTS, FOR EXAMPLE DURING SURGERY

BACKGROUND

1. Field

This disclosure generally relates to the detection of the presence or absence of objects tagged with transponders, which may, for example, allow the detection of surgical objects during surgery.

2. Description of the Related Art

It is often useful or important to be able to determine the presence or absence of an object.

For example, it is important to determine whether objects associated with surgery are present in a patient's body before completion of the surgery. Such objects may take a variety of forms. For example, the objects may take the form of instruments, for instance scalpels, scissors, forceps, hemostats, and/or clamps. Also for example, the objects may take the form of related accessories and/or disposable objects, for instance surgical sponges, gauzes, and/or pads. Failure to locate an object before closing the patient may require additional surgery, and in some instances may have serious adverse medical consequences.

Some hospitals have instituted procedures which include checklists or requiring multiple counts to be performed to track the use and return of objects during surgery. Such a manual approach is inefficient, requiring the time of highly trained personnel, and is prone to error.

Another approach employs transponders and a wireless interrogation and detection system. Such an approach employs wireless transponders which are attached to various objects used during surgery. The interrogation and detection system includes a transmitter that emits pulsed wideband wireless signals (e.g., radio or microwave frequency) and a detector for detecting wireless signals returned by the transponders in response to the emitted pulsed wideband signals. Such an automated system may advantageously increase accuracy while reducing the amount of time required of highly trained and highly compensated personnel. Examples of such an approach are discussed in U.S. Pat. No. 6,026,818, issued Feb. 22, 2000, and U.S. Patent Publication No. US 2004/0250819, published Dec. 16, 2004.

Commercial implementation of such an automated system requires that the overall system be cost competitive and highly accurate. In particular, false negatives must be avoided to ensure that objects are not mistakenly left in the patient. Some facilities may wish to install a single interrogation and detection system in each surgery theater, while other facilities may move an interrogation and detection system between multiple surgical theaters. In either case, the overall system will require a large number of transponders, since at least one transponder is carried, attached or otherwise coupled to each object which may or will be used in surgery. Consequently, the transponders must be inexpensive. However, inexpensive transponders typically have a relatively large variation in the frequency of signals they emit, making it difficult to accurately detect the signals returned by the transponders. This may be particularly difficult in some environments which are noisy with respect to the particular resonant frequencies of the transponders. Consequently, a new approach to detection of the presence and absence of transponder that facilitates the use of inexpensive transponders is highly desirable.

BRIEF SUMMARY OF THE INVENTION

In one embodiment, a method of operation of a transponder detection device includes during each of a plurality of detection cycles, receiving electromagnetic signals during a noise detection portion of the detection cycle; determining a value indicative of a noise level based at least in part of the received electromagnetic signals; adjusting a detection threshold based at least in part on at least one determined value indicative of the noise level; emitting at least one electromagnetic interrogation signal during a transmit portion of the detection cycle; receiving electromagnetic signals during a receive response portion of the detection cycle that follows the transmit portion of the detection cycle; and determining the presence or absence of a transponder based at least in part on the received electromagnetic signals and the adjusted detection threshold. The noise detection portion may be less than twenty-five percent of the detection cycle, for example equal to or less than approximately ten percent of the detection cycle.

The method may also include averaging the values indicative of the noise level over at least two of the detection cycles, and wherein adjusting a detection threshold based at least in part on the determined value indicative of the noise level includes adjusting the detection threshold based at least in part on an average of the values indicative of the noise levels over multiple samples or measurements of at least one of the detection cycles. For example, the average may be a moving average.

Determining the presence or absence of a transponder based at least in part on the received electromagnetic signals and the adjusted detection threshold may include match filtering an accumulated response signal with at least one in-phase reference signal and at least one quadrature reference signal to determine a magnitude of the accumulated response signal, where the accumulated response signal is indicative of the electromagnetic signals received during the receive response portion of at least two of the detection cycles.

The method may also include ignoring any electromagnetic signals received during a recovery portion of the detection cycle that precedes the receive response portion of the detection cycle. The method may also include dumping energy from an antenna circuit during a dump portion of the detection cycle that precedes the recovery portion of the detection cycle. The method may also include varying a time between a start of a first one of successive pairs of the detection cycles and a start of a next successive pair of the detection cycles. The transmit and receive response portions may each occur during an interrogation portion of the detection cycle, which follows the noise detection portion of the detection cycle.

The interrogation signals may be wide band electromagnetic interrogation signals. The interrogations signals may be centered around one center channel or frequency, or may be hop between two or more center channels or frequencies. Frequency hopping may include automatically determining a first adjustment to spread energy across a first frequency band; automatically determining a second adjustment to spread energy across a second frequency band; transmitting a signal in the first frequency band during a first time; transmitting a signal in the second frequency band during a second time; receiving a response, if any, to the transmission of the signal in the first frequency band; and receiving a response, if any, to the transmission of the signal in the second frequency band.

The method may also include accumulating the electromagnetic signals received during the noise detection portion of at least two of the detection cycles into an accumulated noise signal, comparing the accumulated noise signal against an ambient noise threshold; and taking a fault action if the accumulated noise signal exceeds the ambient noise threshold. The method may also include comparing a transmit voltage to a transmit voltage threshold; and taking a fault action if the transmit voltage is below the transmit voltage threshold.

In another embodiment, a transponder detection system includes transmitting means for transmitting electromagnetic interrogation signals during at least one transmit portion of each of a plurality of detection cycles; receiving means for receiving electromagnetic signals during a noise detection portion and a receive response portion of each of the detection cycles; noise level determination means for determining a noise level during the noise detection portion of detection cycle, the noise detection portion temporally spaced from the transmit portions such that transponders are not responding to the electromagnetic interrogation signals; detection threshold adjustment means for adjusting a detection threshold of the transponder detection system based at least in part on at least one value indicative of at least one of the noise levels; means for determining the presence or absence of the transponders based at least in part on the received electromagnetic signals and the adjusted detection threshold. The noise detection portion may be is less than twenty-five percent of the detection cycle, for example equal to or less than approximately ten percent of the detection cycle.

The transponder detection system may also include averaging means for averaging a plurality of the determined noise levels over multiple samples or measurements of at least one of the plurality of detection cycles, and wherein the detection threshold adjusting means adjusts a detection threshold based at least in part on the determined noise level includes adjusting the detection threshold based at least in part on average of the determined noise levels over at least two of the detection cycles. The average may be a moving average.

The transponder detection system may also include recovery means for ignoring any electromagnetic signals received during a recovery portion of the detection cycle that precedes the receive response portion of the detection cycle, dumping means for dumping energy from an antenna circuit during a dump portion of the detection cycle that precedes the recovery portion of the detection cycle; and dithering means for varying a time between a start of a first one of the successive pairs of the detection cycles and a start of a next successive one of the pairs of the detection cycles.

The transmitting means may include frequency adjustment means adjusting a center frequency of the electromagnetic interrogation signals between successive transmit portions of the detection cycle. The frequency adjustment means may include adjustment determination means for automatically determining at least a first adjustment to spread energy across a first frequency band centered around a first center frequency and a second adjustment to spread energy across a second frequency band centered around a second center frequency and adjusting means for adjusting the spread of energy in response to the adjustment determination means.

In yet another embodiment, a transponder detection system includes a receiver configured to receive electromagnetic signals during a noise detection portion and at least one receive response portion of each of a plurality of detection cycles, a transmitter configured to transmit at least one electromagnetic interrogation signal during at least one transmit portion of each of the detection cycles, a controller configured to adjust a detection threshold of the transponder detection system based at least in part on at least one determined value indicative of a noise level and to determine whether the electromagnetic signals received during the at least one receive response portion of the detection cycles were received from a transponder in response to the electromagnetic interrogation signals based at least in part on the adjusted detection threshold. The noise detection portion is less than twenty-five percent of the detection cycle, for example, equal to or less than approximately ten percent of the detection cycle.

The controller may be configured to average or integrate a plurality of determined noise levels over multiple samples or measurements of at least one of detection cycles, and to adjust the detection threshold based at least in part on the average of the determined noise levels over at least two of the detection cycles. The average may be a moving average.

The controller may be configured to determine a noise level value indicative of a noise level based at least in part of the electromagnetic signals received during the noise detection portion of the detection cycles. The controller may be configured to ignore any electromagnetic signals received during a recovery portion of the detection cycles that precedes the receive response portion of the detection cycles, and to dump energy from an antenna circuit during a dump portion of the detection cycles that precedes the recovery portion of the detection cycles. The controller may configured to vary a time between a start of a first one of a successive pair of the detection cycles and a start of a next successive one of the pair of the detection cycles, for each successive pair of detection cycles.

The controller may be to determine a presence or absence of a transponder by match filtering an accumulated response signal with at least one in-phase reference signal and at least one quadrature reference signal to determine a magnitude of the accumulated response signal, where the accumulated response signal is indicative of the electromagnetic signals received during the receive response portion of at least two of the detection cycles. The controller may be configured to accumulate the electromagnetic signals received during the noise detection portion of at least two of the detection cycles into an accumulated noise signal, compare the accumulated noise signal against an ambient noise threshold, and take a fault action if the accumulated noise signal exceeds the ambient noise threshold. The controller may further be configured to compare a transmit voltage to a transmit voltage threshold, and take a fault action if the transmit voltage is below the transmit voltage threshold.

The controller may be configured to adjust a frequency of the electromagnetic interrogation signals during at least two transmit portions during each of the detection cycles. In such an embodiment, the transponder detection system may also include an antenna removably coupled to a transmission line to form a low Q tuned LC circuit with the number of switch capacitors. In such an embodiment, the transponder detection system may also include a dynamic tuning circuit coupled to the transmitter circuit and configured to tune about a respective center channel within each of the frequency bands to increase an equalization of a distribution of energy in the respective frequency band; and a receiver circuit configured to receive signals returned by a transponder in response to the signals in the plurality of frequency bands.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with transmitters, receivers, or transceivers have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
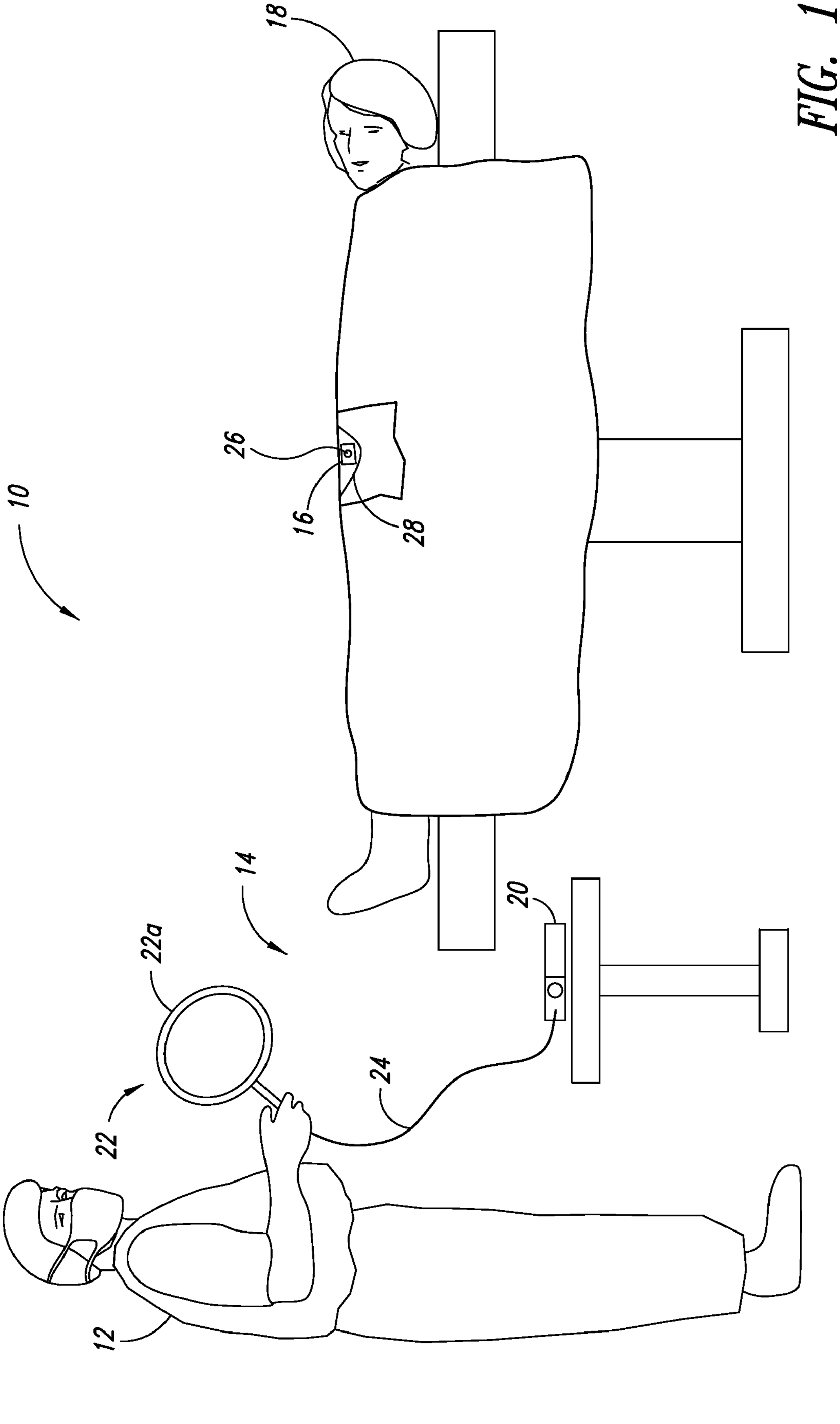
FIG. 1 is a schematic diagram showing a surgical environment illustrating a medical provider using an interrogation and detection system to detect an object tagged with a transponder in a patient, according to one illustrated embodiment.

FIG. 1 shows a surgical environment 10 in which a medical provider 12 operates an interrogation and detection system 14 to ascertain the presence or absence of objects 16 in, or on, a patient 18. The interrogation and detection system 14 may include a controller 20, and an antenna 22 coupled to the controller 20 by one or more communication paths, for example coaxial cable 24. The antenna 22 may take the form of a hand-held wand 22*a*.

The object 16 may take a variety of forms, for example instruments, accessories and/or disposable objects useful in performing surgical procedures. For instance, the object 16 may take the form of scalpels, scissors, forceps, hemostats, and/or clamps. Also for example, the objects 16 may take the form of surgical sponges, gauze and/or padding. The object 16 is tagged, carrying, attached or otherwise coupled to a transponder 26. Embodiments of the interrogation and detection system 14 disclosed herein are particularly suited to operate with transponders 26 which are not accurately tuned to a chosen or selected resonant frequency. Consequently, the transponders 26 due not require high manufacturing tolerances or expensive materials, and thus may be inexpensive to manufacture.

In use, the medical provider 12 may position the wand 22*a* proximate the patient 18 in order to detect the presence or absence of the transponder 26. and hence an object 16 The medical provider 12 may in some embodiments move the wand 22*a* along and/or across the body of the patient 18. In some embodiments, the wand 22*a* may be sized to fit at least partially in a body cavity 28 of the patient 18.

Figure 2A:
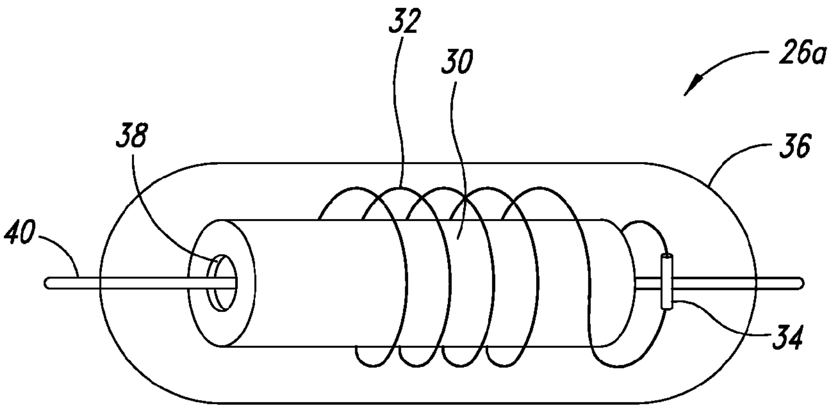
FIG. 2A is a schematic diagram of a transponder, according to one illustrated embodiment.

FIG. 2A shows a transponder 26*a* according to one illustrated embodiment.

The transponder 26*a* includes a miniature ferrite rod 30 with a conductive coil 32 wrapped about an exterior surface thereof to form an inductor (L), and a capacitor (C) 34 coupled to the conductive coil 32 to form a series LC circuit. The conductive coil 32 may, for example, take the form of a spiral wound conductive wire with an electrically insulative sheath or sleeve. The transponder 26*a* may include an encapsulation 36 that encapsulates the ferrite rod 30, conductive coil 32, and capacitor 34. The encapsulant 36 may be a bio-inert plastic, that protects the ferrite rod 30, conductive coil 32 and/or capacitor 34 from pressure and/or from fluids, for example bodily fluids.

In some embodiments, the ferrite rod 30 may include a passage 38 sized to receive a physical coupler, for example a bonding tie or string 40. The bonding tie or string 40 may take the form of an elastomeric x-ray opaque flexible elongated member, that may be used to attach the transponder 26*a* to various types of objects 16, for example surgical sponges. The transponder 26*a* may have a length of about 8 millimeters and a diameter of about 2 millimeters. Employing such small dimensions ensures that the transponder 26*a* does not impede deformation of objects 16 such as sponges. The transponder 26*a* may include an optional diode (not shown), to protect against over-voltage occurrences caused by other electronic instruments.

Figure 2B:
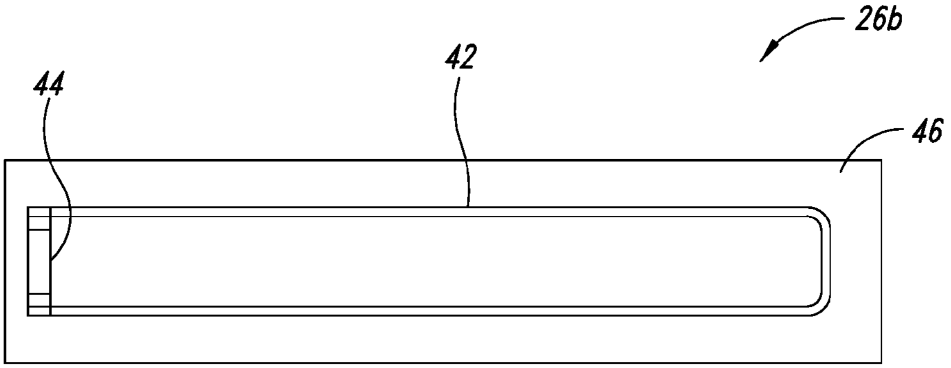
FIG. 2B is a schematic diagram of a transponder, according to another illustrated embodiment.

FIG. 2B shows a transponder 26*b*, according to another illustrated embodiment.

The transponder 26*b* includes a single loop of conductive material 42, for example a loop of conductive wire forming an inductor (L), coupled in series to a capacitor 44 (C) to form an LC series circuit. The loop of conductive material 42 and capacitor 44 may be encapsulated in an elastomeric coating or sleeve 46. The dimensions of the transponder 26*b* may be similar to the dimensions of the transponder 26*a*. In some embodiments, the dimensions of the transponder 26*b* are greater than the dimensions of the transponder 26*a*. The transponder 26*b* is highly flexible, and thus may provide its own thread-like or string-like attachment to various types of objects 16.

Figure 2C:
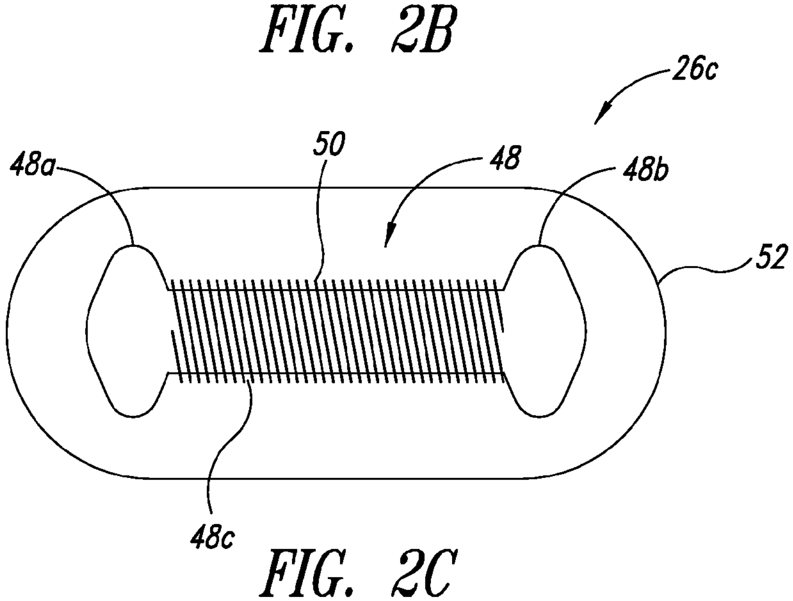
FIG. 2C is a schematic diagram of a transponder, according to a further illustrated embodiment.
Figure 2D:
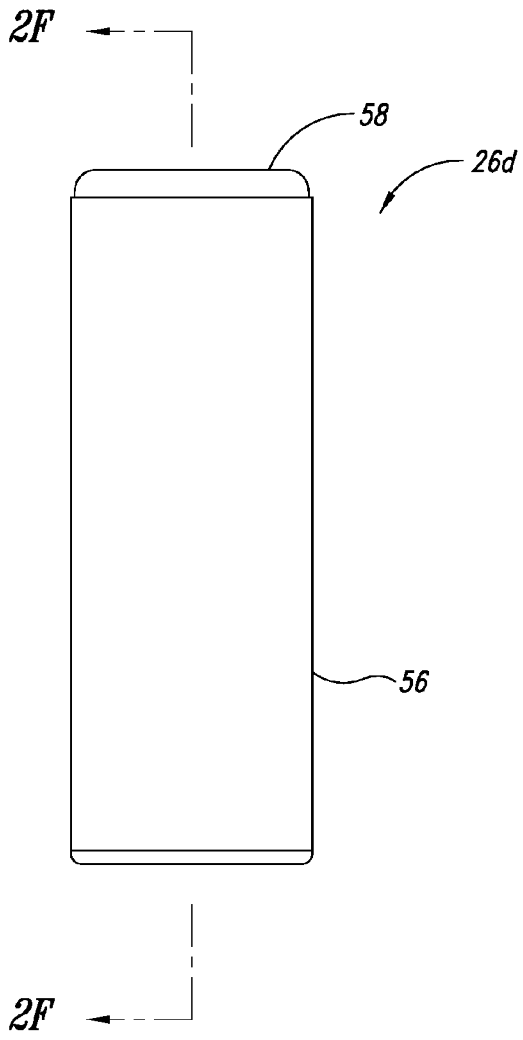
FIG. 2D is a side elevational view of a transponder, according to yet a further illustrated embodiment.
Figure 2E:
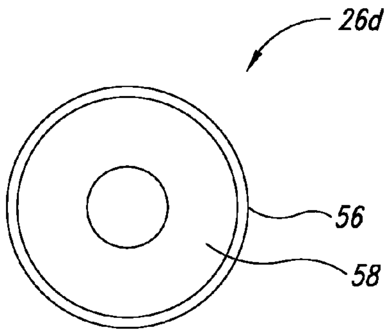
FIG. 2E is an end view of the transponder of FIG. 2D.
Figure 2F:
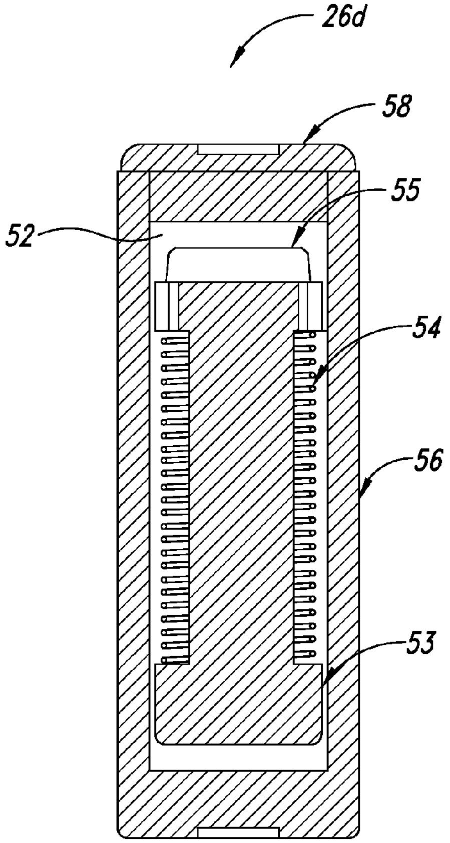
FIG. 2F is a cross-sectional view of the transponder of FIG. 2D, taken along section line 2F.
Figure 2G:
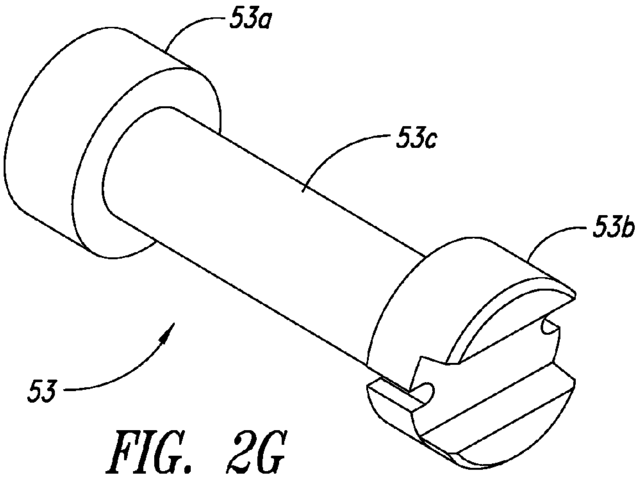
FIG. 2G is an isometric view of a ferrite core of the transponder of FIG. 2D.

FIG. 2C shows a transponder 26*c* according to a further embodiment.

The transponder 26*c* includes a dumbbell-shaped ferrite rod 48 having broad end portions 48*a*, 48*b*, and a narrow intermediate portion 48*c* which is wrapped by a conductive coil 50. The broad portions 48*a*, 48*b* contain the conductive coils 50. Such a design may provide stronger and/or more reliable signal emission than transponders 26*a*, 26*b* fashioned with cylindrical ferrite rods. The transponder 26*c* may optionally include an encapsulant 52. Further details regarding the transponder 26*c* may be found in U.S. Provisional Patent Application No. 60/811,376 filed Jun. 6, 2006. In some embodiments, the transponder 26*c* may be formed as a fusiform-shaped object, with truncated ends. The fusiform shape may be advantageous over cylindrical shaped transponders 26*a*, 26*b* in reducing the likelihood of close parallel alignment of the transponders 26*a*, 26*b*, which may produce transponder-to-transponder interaction and interference.

FIGS. 2D-2G show a transponder 26*d* according to yet a further embodiment.

The transponder 26*d* includes a ferrite core 53, inductor (L) 54, and capacitor © 55 electrically coupled to the inductor 54 to form an LC series circuit. The transponder 26*d* also includes a capsule 56 with a cavity 57 open at one end to receive the ferrite core 53, inductor 54 and capacitor 55, as well as a lid 58 to close the open end of the capsule 56.

The ferrite core 53 may, for example, take the form of a soft ferrite drum, and may, for example, be formed of Nickel Zinc. Suitable ferrite cores 53 may be commercially available from TAK FERRITE as part no. L8A DR3X9 B=1.8 F=6 or from HUAH YOW under part no. 10R030090-77S. The drum may have a pair of larger diameter end portions 53*a*, 53*b*, with a smaller diameter intermediate portion 53*c* therebetween.

The inductor 54 may take the form of magnet wire wrapped around the intermediate portion 53*c* of the ferrite core 53. The magnet wire may, for example, have a dimension of approximately 41 American Wire Gauge (AWG), although some embodiments may employ wires or conductors of larger or small gauges. Suitable inductors 54 may be commercially available from ELEKTISOLA under part no. PN-155 or from ROSEN under part no. 2UEW-F. The inductor may, for example, include approximately 432 turns, over approximately 6.5 layers, although some embodiments may include a greater or lesser number of turns and/or layers. The transponder 26*d* may include tape and/or epoxy enveloping the inductor 54. Suitable tape may be commercially available from 3M under part nos. 1298, 1350-1 or PLEO 1P801, while suitable epoxy may be commercially available from LOCKTITE under part no. 3211.

The capacitor 55 may, for example, take the form of a ceramic capacitor. The capacitor 55 may, for example, have a capacitance of 470 PF, 100V, with a Quality factor of Q>2200@1 MHz. Suitable capacitors 55 may be commercially available from SANJV DIELECTRIC under part no. 0805NPO471J101 or from FENG HUA under part no. 0805CG471J101 NT.

The capsule 56 and lid 58 may, for example, be formed of a polypropylene. Suitable capsules 56 and lids 58 may be commercially available from WEITHE ELECTRON (HK) COMPANY, under part specification CASE 4.3×12.6. The combination of the capsule 56 and lid 58 may, for example, have a length of approximately 12.8 mm and a diameter of 4.4 mm. Circuit bonds may, for example, employ UNITED RESINS CORP. part no. 63001500 CIRCUIT BOND LV, while solder may take the form of a lead free 96.5% Ag/3% Sn/0.5 Cu solder.

The transponders 26 may be attached to hemostats, scissors, certain forms of forceps, and the like. In some embodiments, the transponders 26 may be coupled to the object 16 by way of a clamp or holder. In some embodiments, the transponders 26 may be retained within a cavity of the holder. In some embodiments, the holder may be fashioned of a durable deformable material, such as surgical grade polymer, which may be deformed to clamp securely onto the finger or thumbhole of an instrument. In other embodiments, the transponders 26 may be attached to objects 16 by way of pouches fashioned of sheet material (e.g., surgical fabric) surrounding the transponder 26. The transponder 26 is retained within the pouch, and in some embodiments the pouch may be sewn or otherwise sealed. Sealing may be done with adhesive, hot glue, clamping, grommeting, or the like.

Figure 3A:
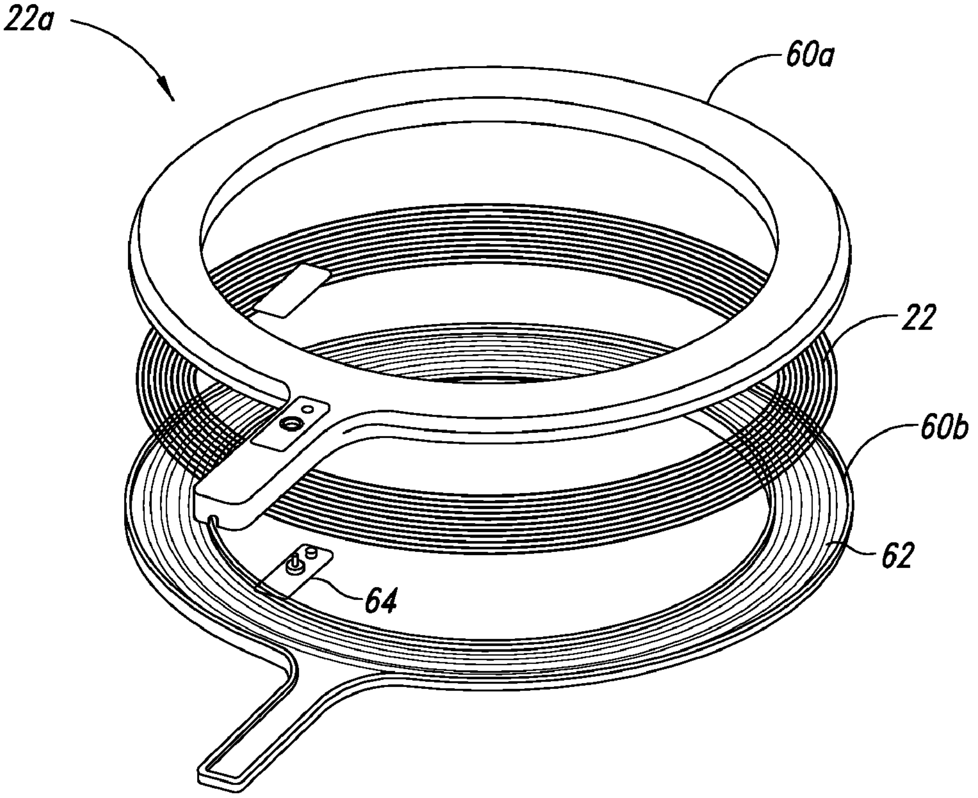
FIG. 3A is an exploded view of a wand of the interrogation and detection system, according to one illustrated embodiment.
Figure 3B:
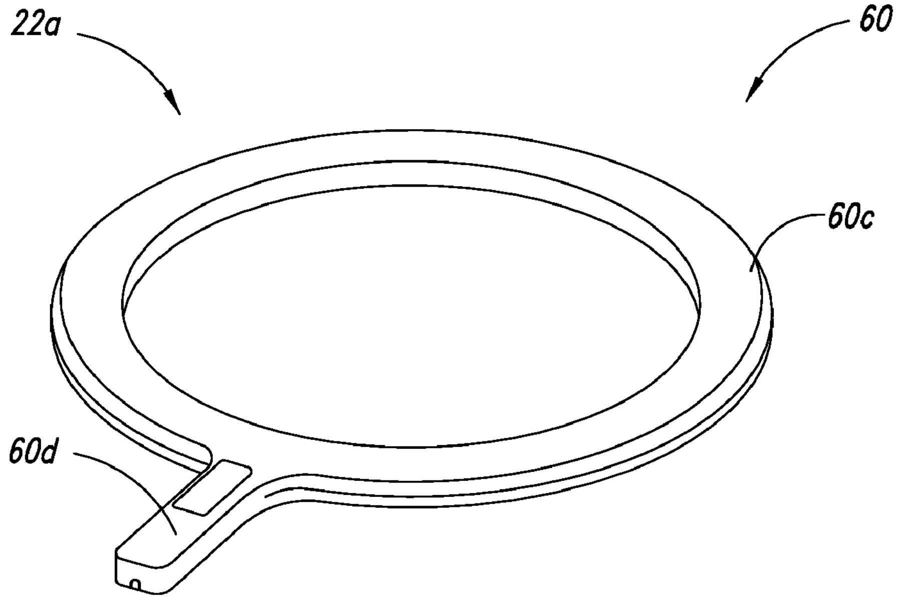
FIG. 3B is an isometric view of the wand of FIG. 3A.

FIGS. 3A and 3B show a wand 22*a*, according to one illustrated embodiment.

The wand 22*a* may include a first housing structure 60*a* and a second housing structure 60*b* which mates to the first housing structure 60*a* to form a housing 60. The housing 60 may include an annular portion 60*c* and a handle portion 60*d* extending from the annular portion. The handle portion may be sized and dimensioned to be gripped by the hand of a medical provider 12 (FIG. 1). In some embodiments, the housing portions 60*a*, 60*b* may be identical in shape to one another.

The housing 60 may define one or more cavities 62 sized and dimensioned to receive the antenna 22. The antenna 22 may, for example, take the form of an annulus or air-coil formed of coils of conductive material, for example wire. In one embodiment, the antenna 22 includes 10 turns evenly spaced between an inner diameter of about 11 inches and an outer diameter of about 14 inches. The antenna 22 acts as an inductor.

The wand 22*a* may include a coupling member 64 which may be positioned in the cavity in the handle portion 60*d* to provide a connector to communicatively couple to an end of the coaxial cable 24 to the antenna 22. The coupling member 64 may take the form of a standard coaxial connector. Some embodiments may employ other types of communications pathways between the controller 20 and the antenna 22, and thus may employ other types of coupling members or connectors.

In some embodiments, the wand 22*a* may include one or more user interface devices, for example one or more visual indicators to provide visual indications to the medical provider 12. Such may, for example, take the form of one or more light emitting diodes, which may produce one or more different colors. Such user interface devices may additionally, or alternatively include a speaker or other transducer, operable to produce a sound or other sensory indication, for example a tactile sensation. Such user interface devices may be configured to provide sensory feedback to the medical provider 12 indicative of an operating condition of the interrogation and detection system 14. For example, such may indicate when the interrogation and detection system 14 is operating, when the presence of a transponder 26 has been identified, and/or when an error has occurred. Locating user interface devices on the wand 22*a* may be advantageous since the medical provider 12 will typically focus their attention on the wand 22*a* while scanning the patient 18.

Figure 4:
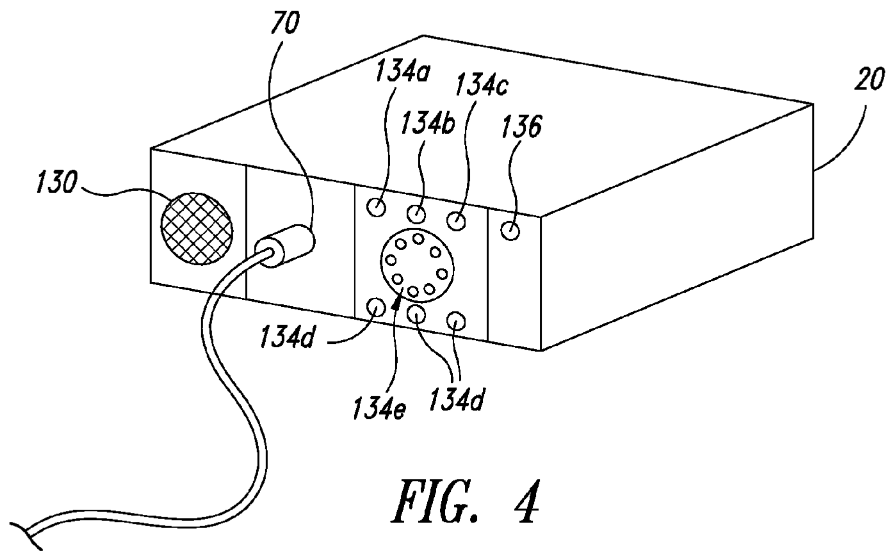
FIG. 4 is an isometric view of a controller of the interrogation and detection system, according to one illustrated embodiment.

FIG. 4 shows the controller 20 according to one illustrated embodiment.

The controller 20 includes an input port 70 with an appropriate coupling member, for example a connector to allow an end of the coaxial cable 24 to be communicatively coupled to the controller 20. As noted above, some embodiments may employ other communications pathways between the controller 20 and the antenna 22, hence other types of coupling members or connectors may be employed. The controller 20 may also include a power switch (not illustrated in FIG. 4), for example, positioned on a back or rear of the controller 20. The controller 20 may further include a power cord (not shown) to couple the controller 20 to a suitable power supply. The power supply may, for example take the form of a standard wall outlet or any other power supply or source. The controller 20 may further include one or more user interface devices for providing information to a user. For example, the controller 20 may include one or more visual indicators 134, for instance one or more light emitting diodes (LEDs) and/or liquid crystal displays. Additionally, or alternatively, the controller 20 may include one or more speakers 130 or other transducers operable to produce sound or tactile sensations.

Figure 5:
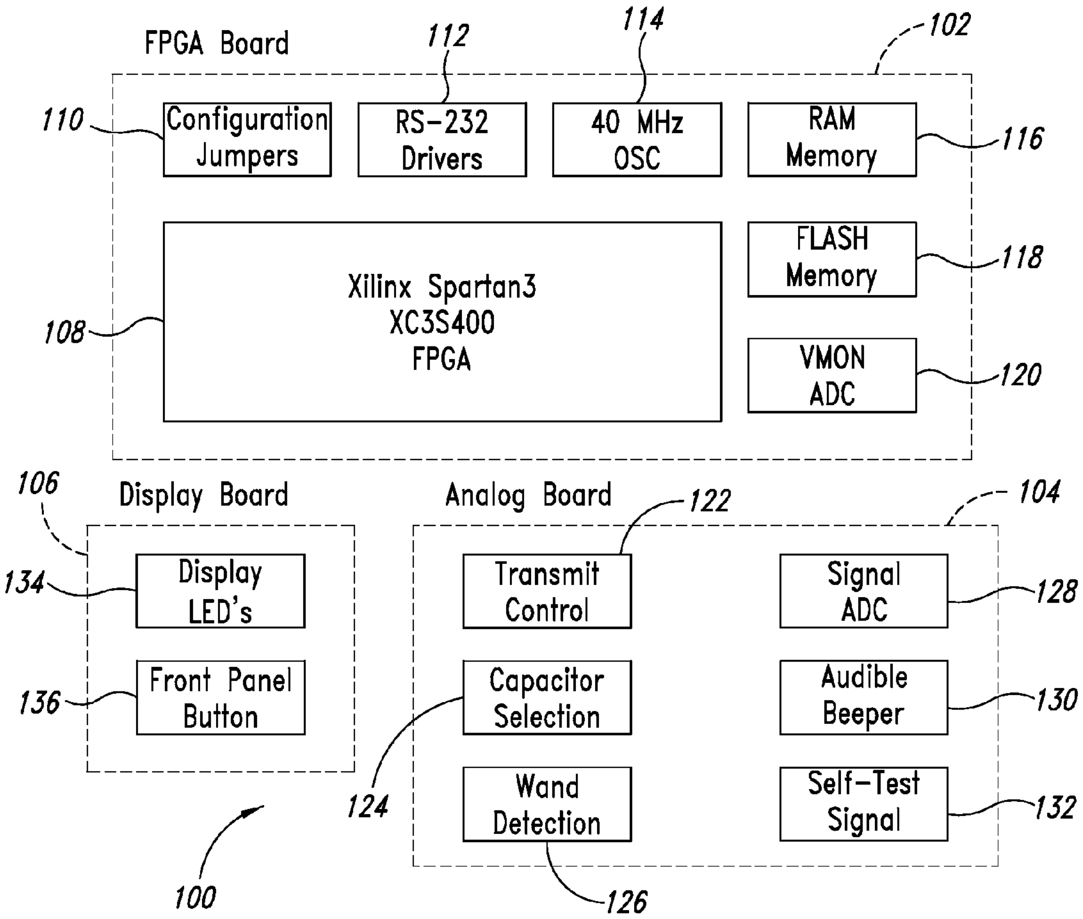
FIG. 5 is a schematic diagram of a control system of the interrogation and detection system, according to one illustrated embodiment.

FIG. 5 shows a control system 100 of the interrogation and detection system 14, according to one illustrated embodiment.

The control system 100 includes a field programmable gate array (FPGA) board 102, analog board 104 and display board 106, communicatively coupled to one another.

The FPGA board includes an FPGA 108, configuration jumpers 110, RS-232 drivers 112, oscillator 114, random access memory (RAM) 116, flash memory 118, and voltage monitoring (VMON) analog-to-digital converter (ADC) 120.

The FPGA 108 may take the form of a Xilinx Spartan3 FPGA, which runs FPGA and application software. As explained below, on power up, the FPGA reads the configuration information and application software program from the flash memory 118.

The configuration jumpers 110 are used to select the application software configuration.

The RS-232 drivers 112 are used to allow the application software to communicate using serial RS-232 data for factory test and diagnostics.

The oscillator 114 sets the clock frequency for the operation of the FPGA 108. The oscillator 114 may, for example, take the form of 40 MHz oscillator, although other frequencies are possible.

The RAM 116 is connected to the FPGA 108 and is available for use by the application software. The application software uses this memory space for storage of both the executable program and program data. The RAM 116 may, for example, have a capacity of 1 MB.

The flash memory 118 contains both the FPGA configuration data and the binary application program. On power up the FPGA 108 reads the flash memory to configure the FPGA 108 and to copy the application program binary data from the flash memory 118 to the RAM 102.

The voltage monitor ADC 120 is connected to the FPGA 108 and controlled by the application software to monitor a power supply and regulated voltage forms in controller electronics.

The analog board 104 includes transmit control circuits 122, capacitor selection circuits 124, wand detection circuit 126, signal ADC 128, audible beeper 130 and self-test signal 132.

Figure 7A:
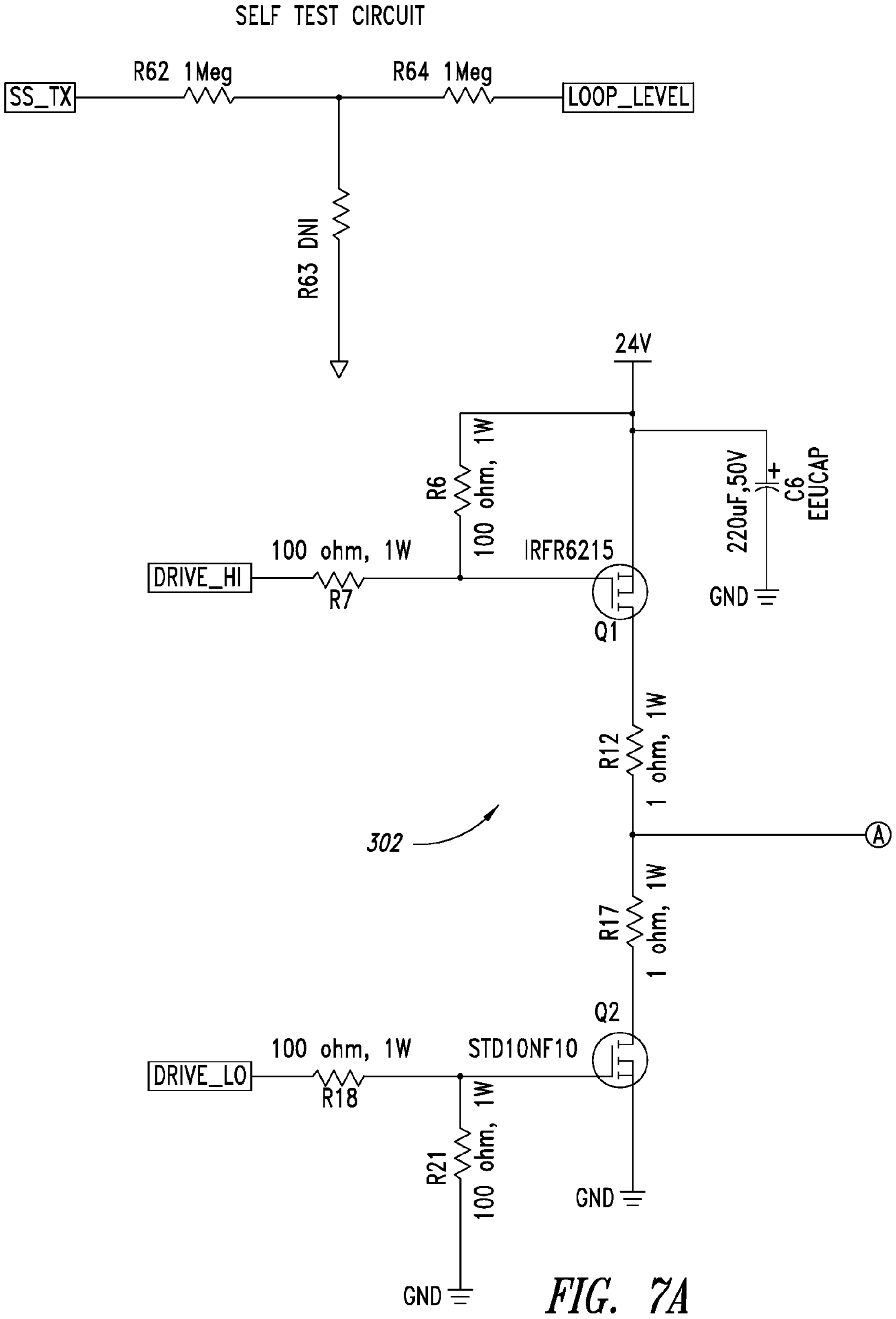
FIGS. 7A-7I are an electrical schematic diagram of the interrogation and detection system including a control circuit and antenna, according to one illustrated embodiment.
Figure 7B:
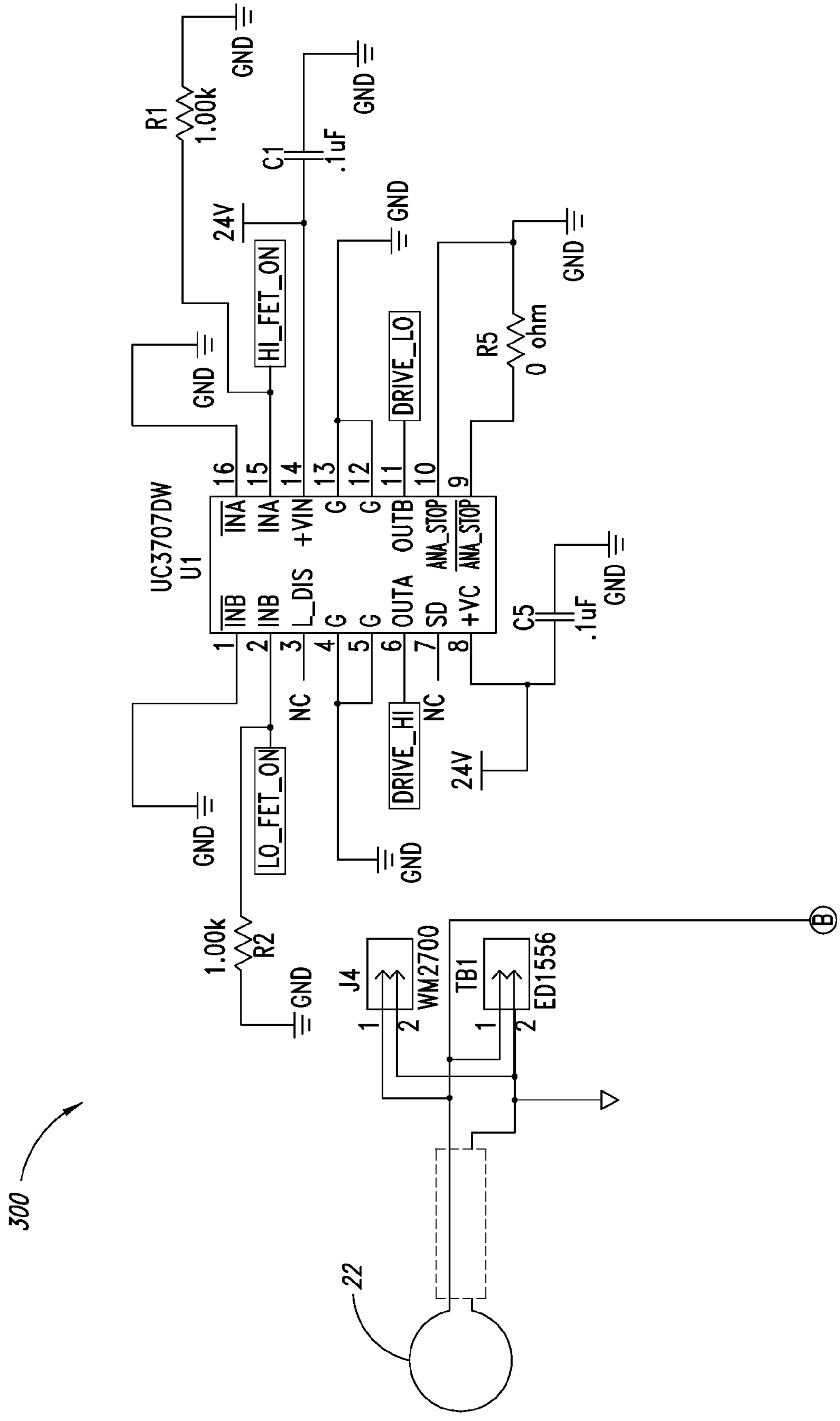
Figure 7C:
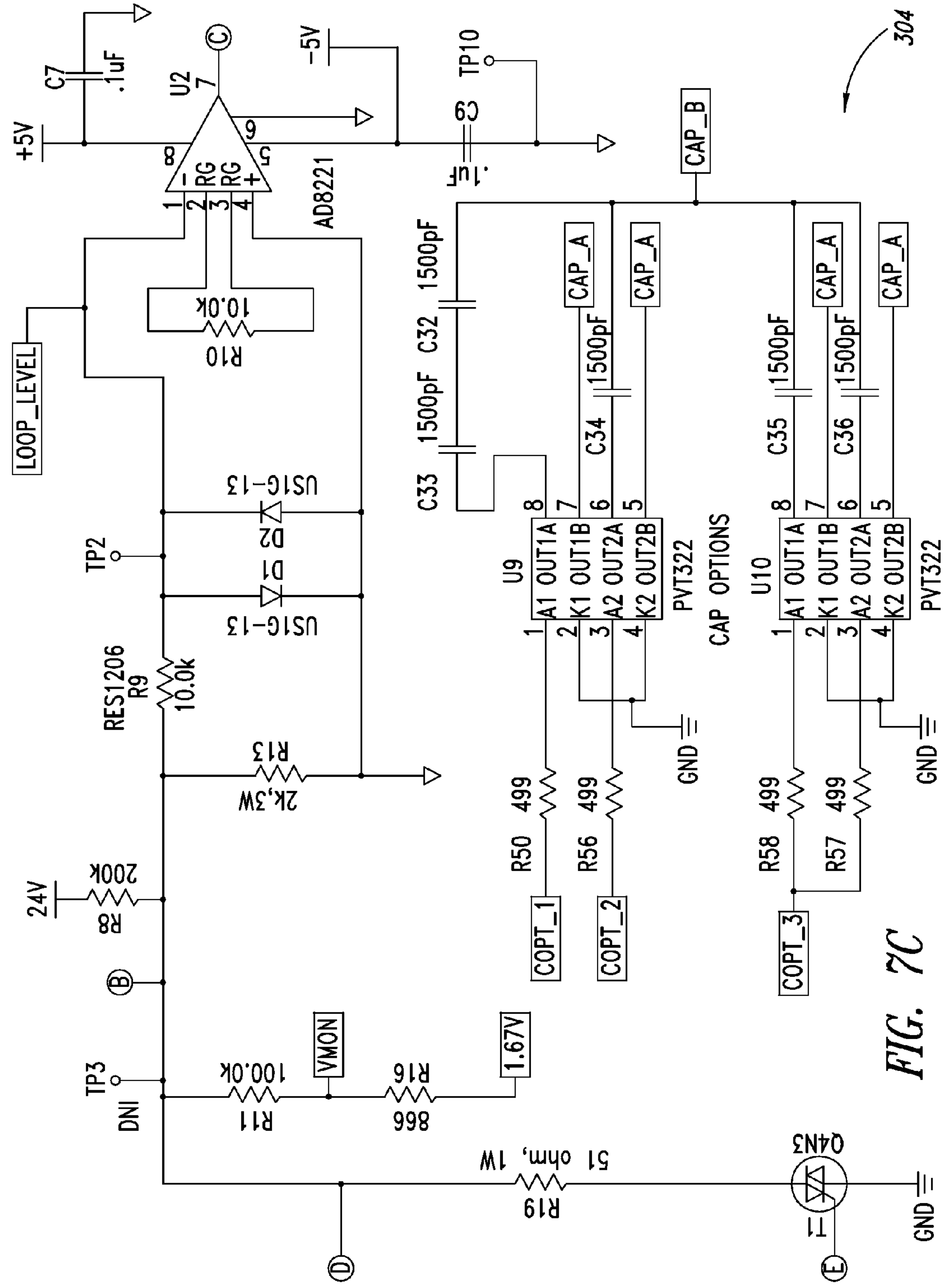
Figure 7D:
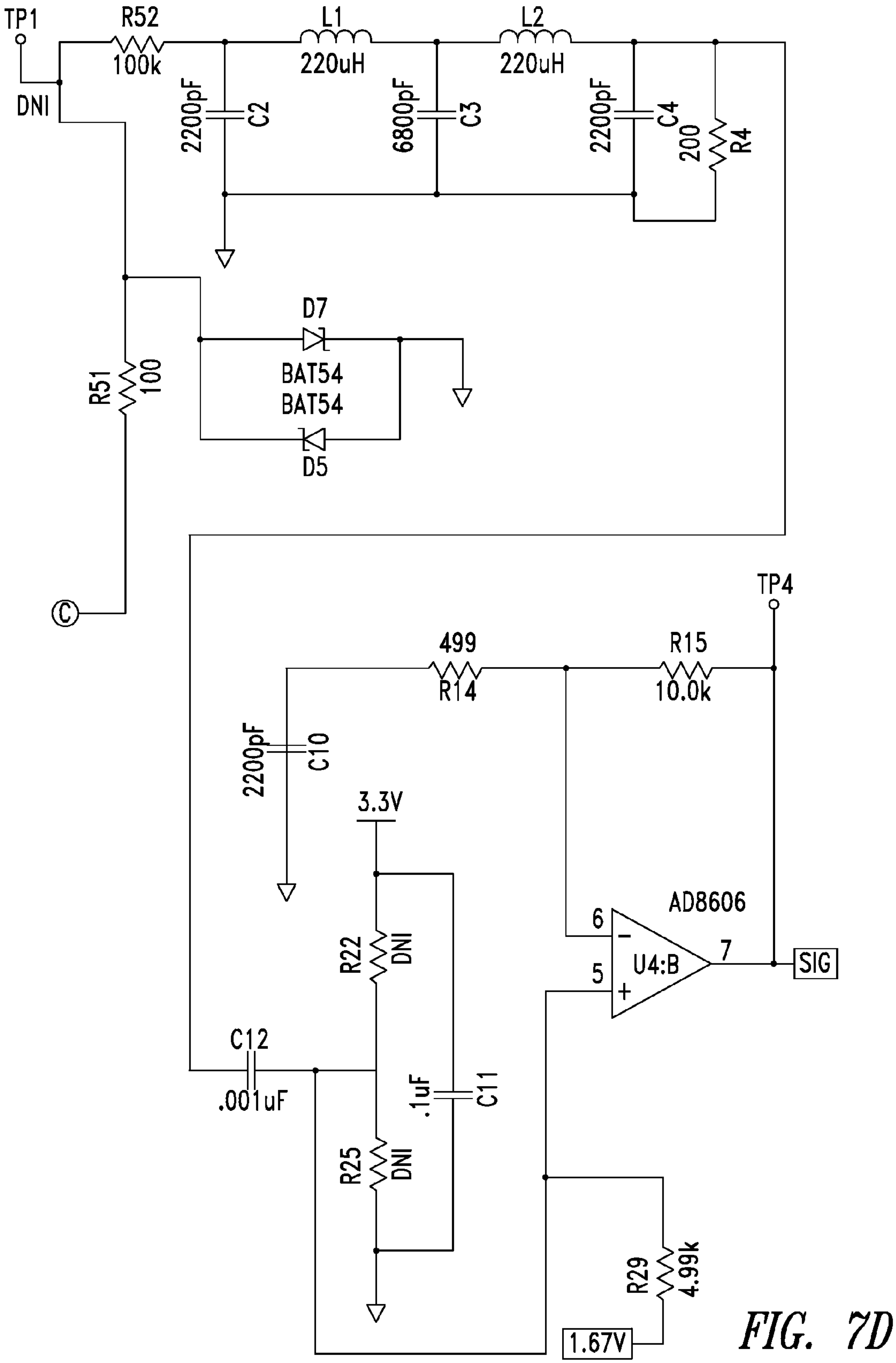
Figure 7E:
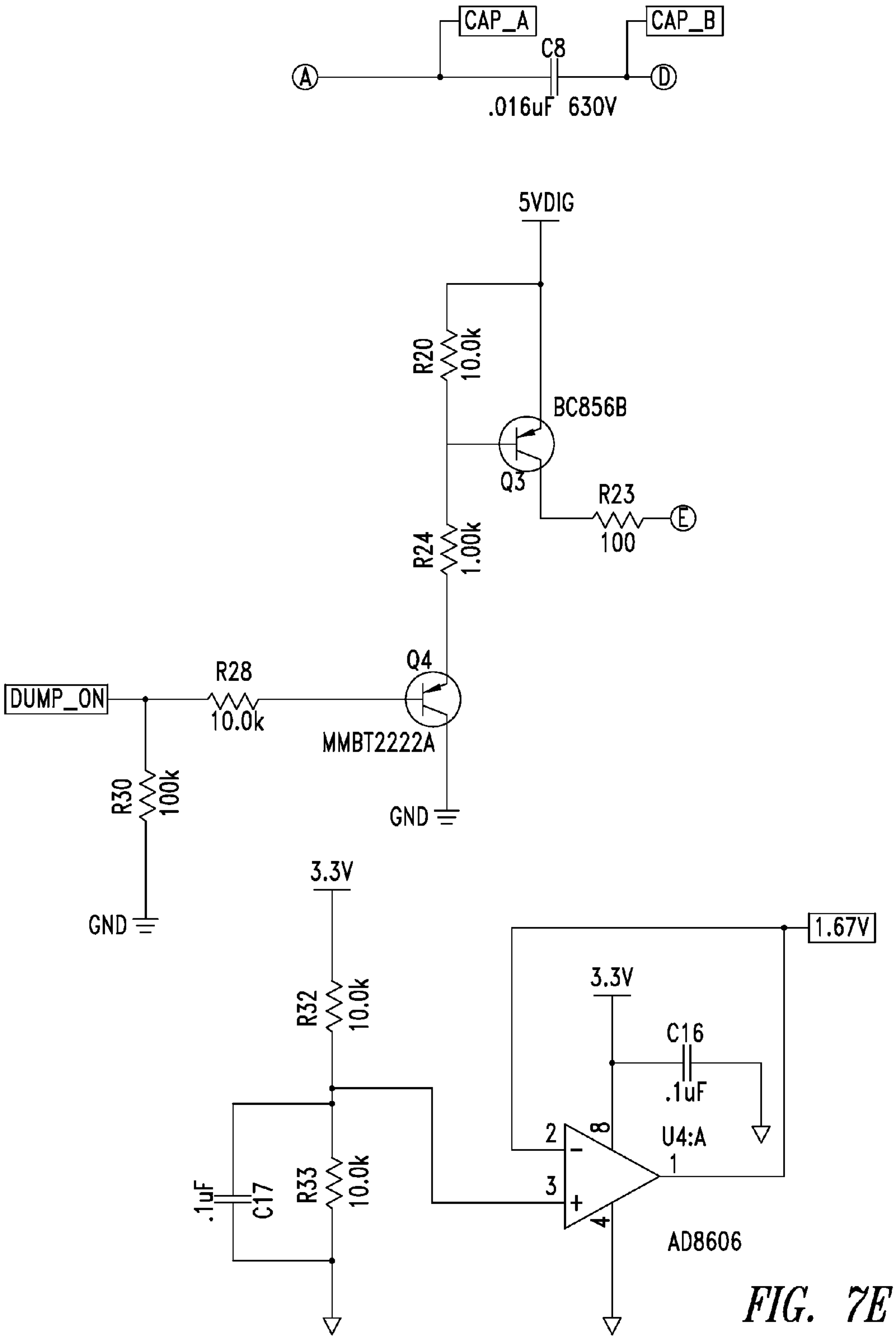
Figure 7F:
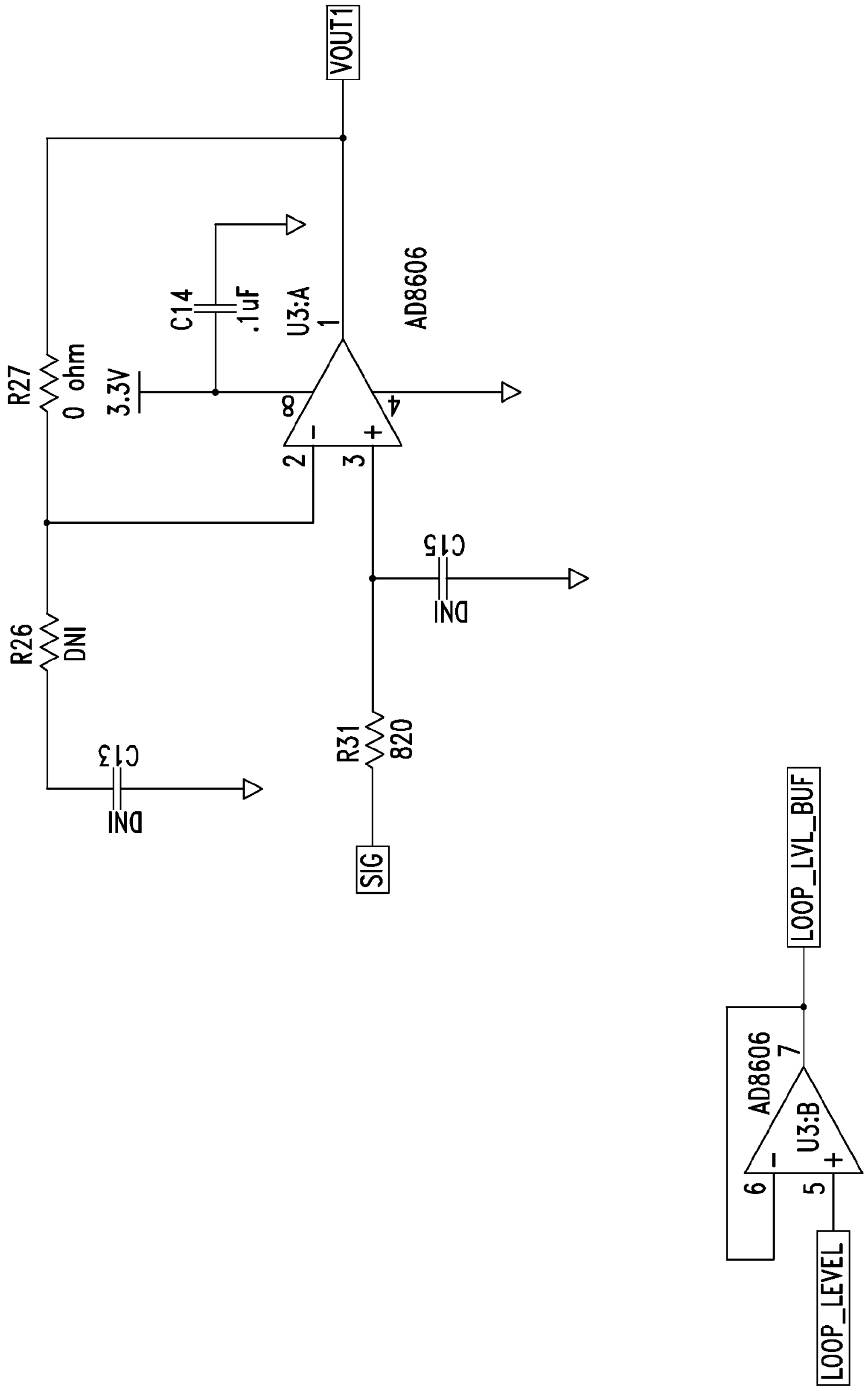
Figure 7G:
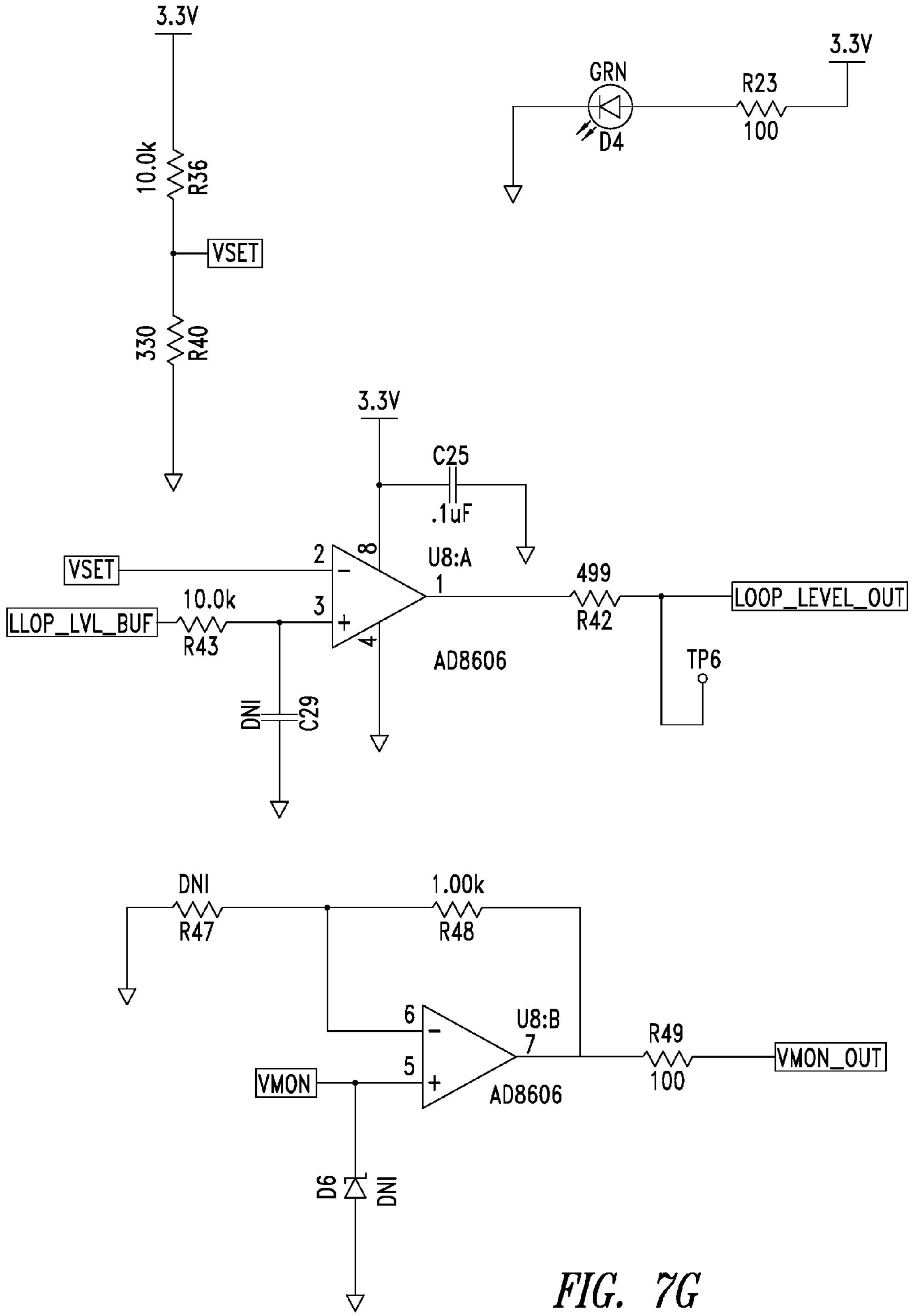
Figure 7H:
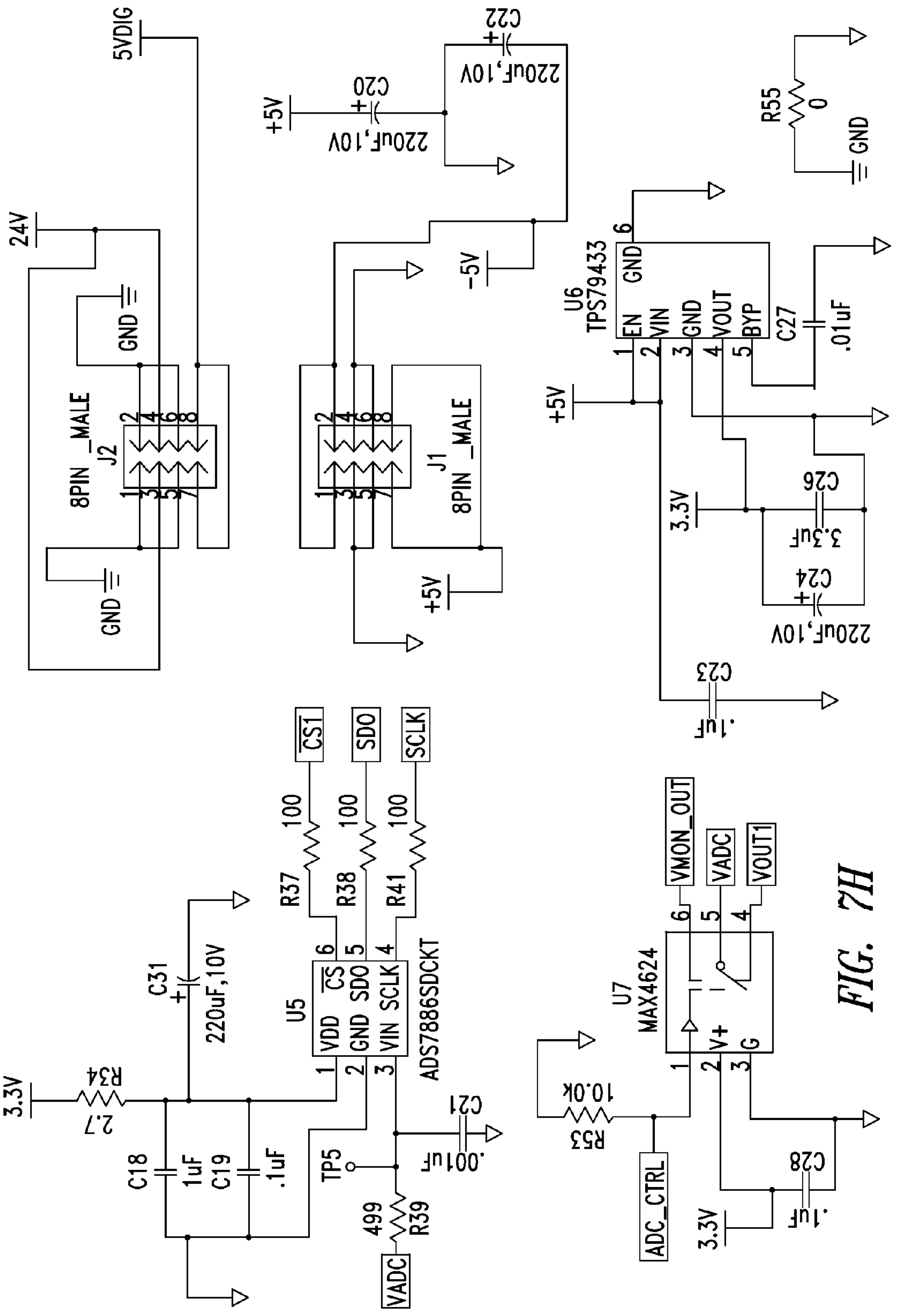
Figure 7I:
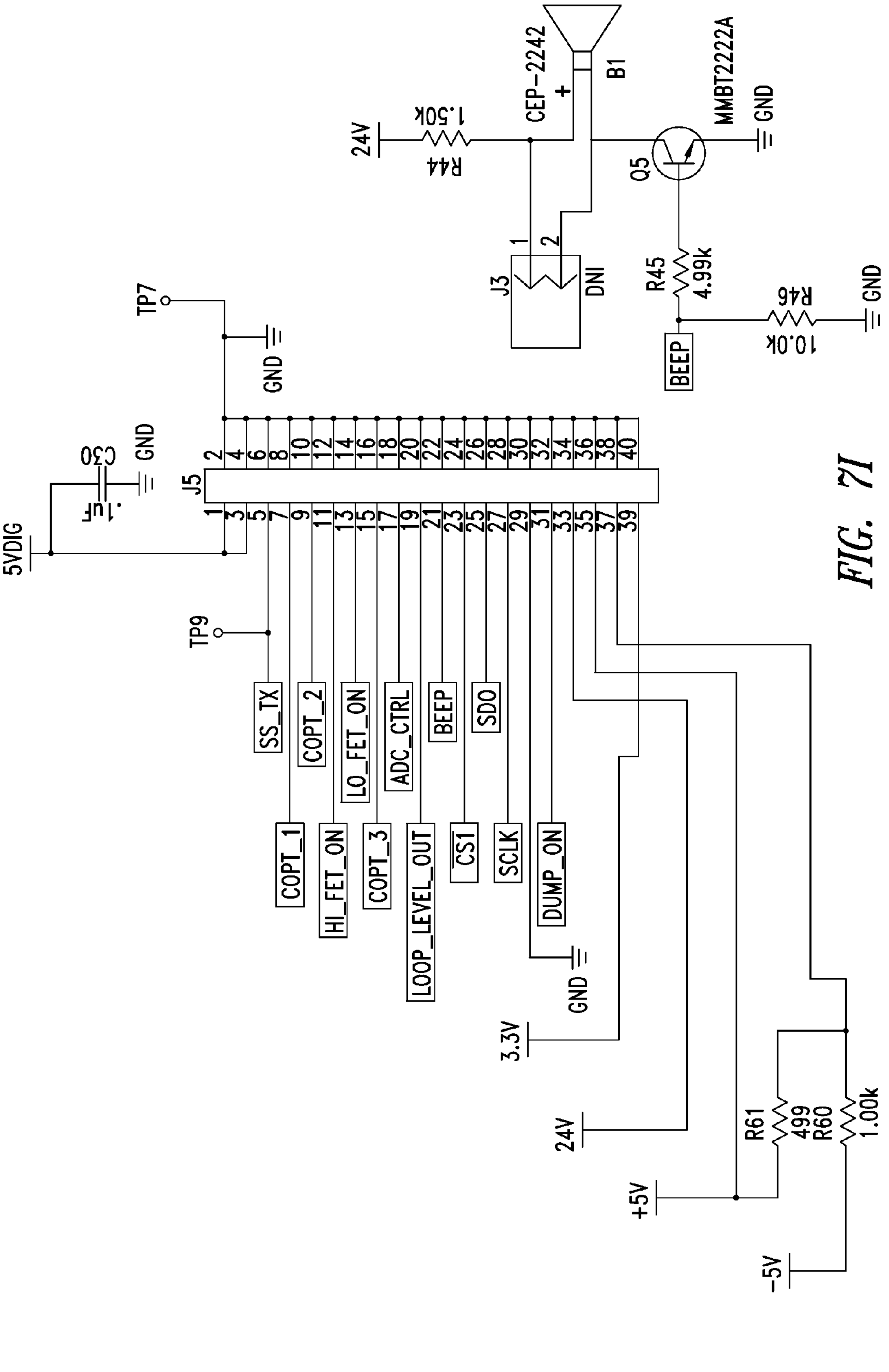

The transmit control circuits 122 on the analog board 104 are controlled by signals from the FPGA 108 to generate a transmit waveform. These signals are denominated as LO_FET_ON and HI_FET_ON, which control the transmit or drive transistors Q1, Q2 (FIG. 7A) along with a signal denominated as DUMP_ON which controls a dump TRIAC (FIG. 7A).

Optional capacitor selection circuits 124 on the analog board 104 are controlled by the signals from the FPGA 108 to tune the drive circuit to match an inductance of the antenna 22.

The wand detection circuit 126 detects when a wand 22*a* is connected to the controller 20. The output of the wand detection circuit 126 drives a signal denominated as the LOOP_LEVEL_OUT signal, which is an input to the FPGA 108.

The signal ADC 128 is used to sample the signals received at the antenna 22*a* from the transponders 26 (FIGS. 2A-2C). The signal ADC 128 may, for example, operate at a 1 MHz sample rate and may have 12-bits of resolution. The FPGA board 102 generates the timing and control signals for the signal ADC 128, which signal are denominated as ADC_CTRL, CS1, SCLK, SD0.

The audible speaker or beeper 130 can be controlled by the FPGA 108 to emit sounds to indicate various states, modes or operating conditions to the medical provider 12 (FIG. 1).

The FPGA 108 can cause the generation of the self test signal 132 on the analog board 104 at the signal ADC 128. Self-testing may be performed at start up, and/or at other times, for example periodically or in response to the occurrence of certain conditions or exceptions.

The display board 106 includes user interface elements, for example a number of light emitting diodes (LEDs) 134. The FPGA board 102 can control the LEDs 134 on the display board 106. The display board 106 also includes a user selectable activation switch, denominated as front panel button 136. The front panel button 136 is connected to the display board 106 which allow the FPGA 108 to monitor when the front panel button 136 is activated (e.g., pressed).

Figure 6:
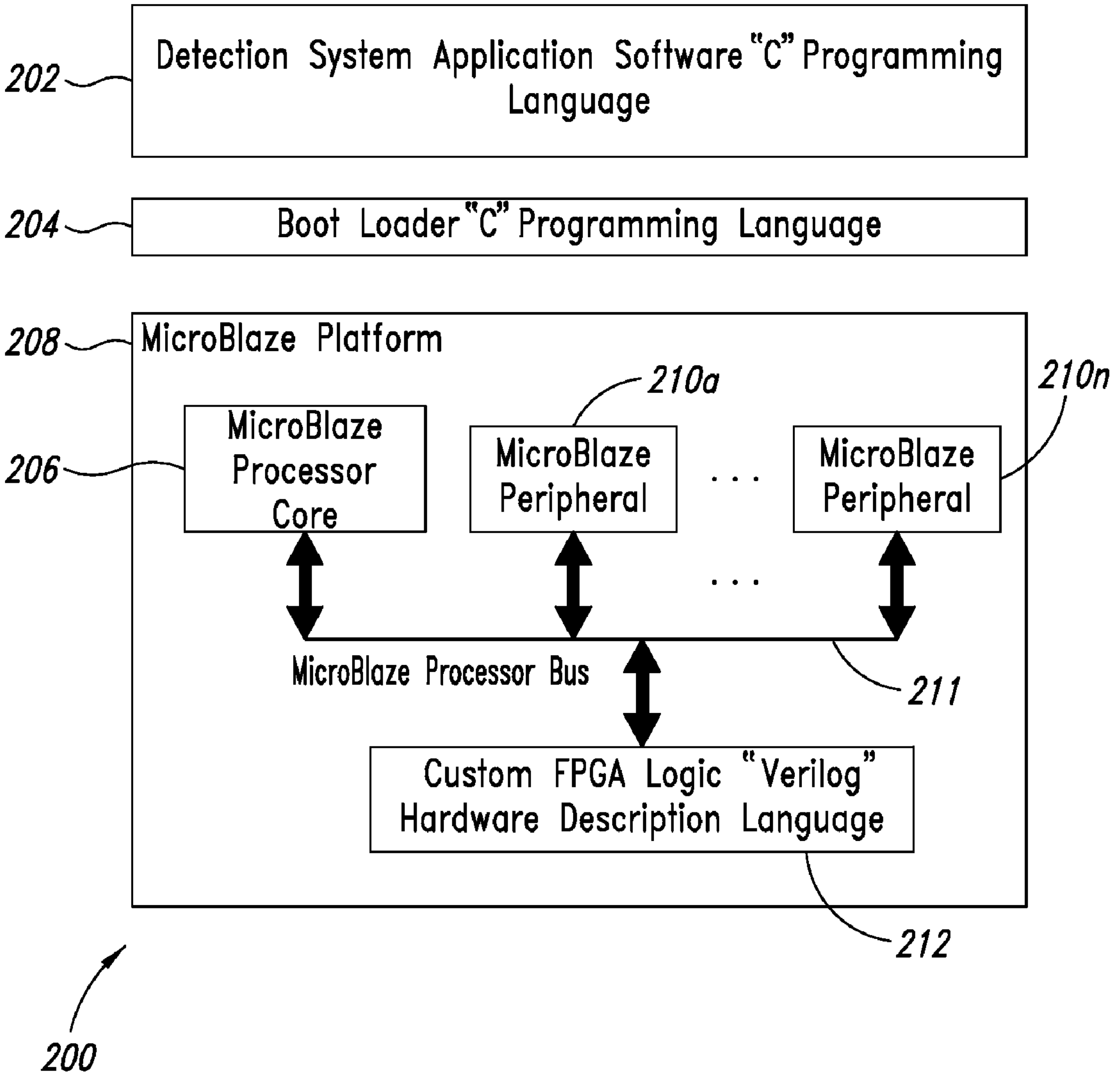
FIG. 6 is a schematic diagram of a software configuration of the interrogation and detection system, according to one illustrated embodiment.

FIG. 6 shows a software configuration 200 of the interrogation and detection system 14, according to one illustrated embodiment.

The software may include application software 202 that is responsible for operating the electronics controller 20 (FIGS. 1 and 4). The application software 202 controls the timing for generating transmit pulses, processes sampled data to detect transponders 26 (FIGS. 2A-2C), and indicates status to the user with the display LED's 134 (FIG. 5) on the display board 106 and/or via the audible speaker or beeper 130 on the analog board 104. The application software 202 is stored in the flash memory 118 (FIG. 5) and transferred into the RAM 116 by a boot loader 204.

The boot loader 204 is automatically loaded when the FPGA 108 is configured, and starts execution after a processor core 206 is reset. The boot loader 204 is responsible for transferring the application software 202 from the flash memory 118 to the external RAM 116.

The processor platform 208 is configured into the FPGA 108 (FIG. 5) on power up from the configuration information stored in the flash memory 118. The processor platform 208 implements a custom microprocessor with a processor core 206, peripherals 210*a*-210*n*, and custom logic 212.

The processor core 206 may take the form of a soft processor core supplied by XILINX under the name MICROBLAZE, that implements a 32-bit processor including memory cashes and a floating point unit. A soft core processor is one that is implemented by interconnected FPGA logic cells instead of by a traditional processor logic. The processor core 206 is connected to the internal FPGA peripherals 210*a*-210*n* using a 32-bit processor bus 211 called the On-Chip Peripheral Bus. The XILINX supplied peripherals for the MICROBLAZE processor core 206 include external memory interfaces, timers, and general purpose I/O.

The custom logic 212 to create the transmit signals, sample the ADC, and accumulate the transponder return signals is designed as a peripheral to the processor core 206. The custom logic 212 is the part of the design of the FPGA 108.

FIGS. 7A-7I show a control circuit 300 according to one illustrated embodiment. The control circuit 300 is used to drive the antenna 22 to excite or interrogate transponders 26 (FIGS. 2A-2C), and to detect and process signals received by the antenna 22 from the transponders 26.

The control circuit 300 includes a transmitter circuit 302 formed by a pair of drive transistors (e.g., field effect transistors) Q1, Q2 operated in a push-pull configuration between a high voltage rail (e.g., 24 V) and a low voltage rail (e.g., GND). The drive transistors Q1, Q2 are responsive to respective drive signals DRIVE_HI, DRIVE_LO, which are applied to the gates of the respective drive transistors Q1, Q2. The drive transistors Q1, Q2 are coupled to the antenna 22 by a non-switched capacitor C8 and the coaxial cable 24. The antenna 22 and capacitor C8, as well as capacitance provided by the coaxial cable 24, form an LC circuit.

Optionally, the control circuit 300 may also include a dynamic tuning circuit 304. The dynamic tuning circuit 304 selectively adjusts the capacitance of the LC circuit. In the illustrated embodiment, the dynamic tuning circuit 304 includes a number of switched capacitors C33-C36 and relays U9, U10. The relays U9, U10 are operated to selectively couple the switched capacitors C33-C36 in series with the non-switched capacitor C8, thereby adjusting the LC characteristics of the LC circuit, and allowing fine tuning of the LC circuit around center frequencies or center channels of a number of wide band frequency bands, as described in more detail below.

Figure 8:
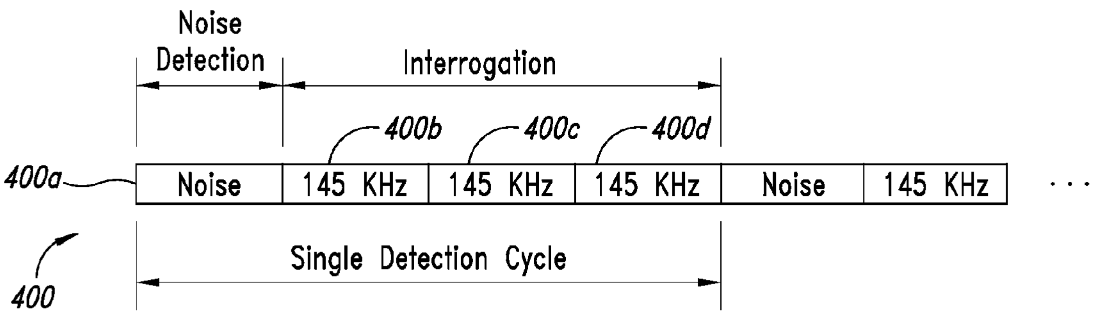
FIG. 8 is a timing diagram illustrating a method of frequency hopping, according to one illustrated embodiment.

FIG. 8 illustrates a detection cycle 400 that employs an approach that optimizes signal to noise ratio (SNR), according to one illustrated embodiment. Such may, for example, advantageously increase range or increase sensitivity at a give range.

One embodiment is optimized based on having an overall detection cycle of not more than 500 milliseconds, that performs well for transponders with resonant frequencies from approximately 139 KHz to approximately 151 KHz, and which has a pulse timing that is consistent with hardware limitations. An optimal SNR may be achieved by, for example, transmitting a single wideband frequency pulse for approximately 450 milliseconds.

The application software 202 (FIG. 6) implements the detection cycle 400 using transmission or interrogation in a frequency band centered around a center channel or frequency. In the illustrated embodiment, the application software 202 sequences through two distinct measurement portions each detection cycle 400, a noise detection portion and an interrogation portion.

During the noise detection portion, which may, for example be a first measurement portion 400*a* of each detection cycle 400, ambient or background noise is measured or sampled, providing a value indicative of a level of ambient or background noise for the particular environment. The noise measurements or samples are taken or captured at a time sufficiently after excitement of the transponders 26 by the interrogation signal emitted by the transmitter such that the transponders 26 are substantially not resonating or responding to any previous excitation by interrogation signals. In particular, a number N of measurements or samples are taken during the noise detection or first measurement portion 400*a*.

During the interrogation portion, which may, for example take the form of the next three measurement portions 400*b*-400*d* of each detection cycle 400. responses by transponders 26 are measured or sampled. The response measurements or samples are taken with the transmitter transmitting or at a time sufficiently close to excitement of the transponders 26 by the interrogation signal emitted by the transmitter such that the transponders 26 are still substantially resonating or responding to the interrogation signal. In particular, a number M of measurements or samples are take during the interrogation or second through third measurement portions 400*b*-400*d*. While shown as three separate portions 400-400*d*, the interrogation portion may take the form of one contiguous or continuous portion or interval, two separate portions or intervals, or more than three portions or intervals. Each of the second, third and fourth portions 400*c*-400*d* may employ the same transmit frequency band, for example centered around 145 KHz. Other center channels or frequencies may for example be 139 KHz or 151 KHz, or any other frequency suitable for exciting the transponder to resonate. Some embodiments may employ frequency hopping, for example transmitting a different center channel or frequency for each of the three measurements 400*b*-400*d* of each detection cycle 400. Such is discussed further in U.S. provisional patent application Ser. No. 60/892,208, filed Feb. 28, 2007.

Some embodiments may arrange the noise detection portion and the interrogation portion, or parts thereof, in a different order.

In one embodiment, the time to accumulate the noise sample or value indicative of a noise level may, for example, be approximately 50 milliseconds, and the time to accumulate one of the three transponder signal measurements approximately 150 milliseconds. Thus, the time for a single detection cycle would the be approximately 500 milliseconds. As noted above, the transmitter is OFF during the first measurement of each detection cycle to measure ambient noise, and the next three measurements are taken with the transmitter transmitting a wideband interrogation signal about the particular center channel or frequency.

The noise samples may be accumulated and averaged or integrated over multiple samples or measurements of one or multiple detection cycles to prevent unwarranted fluctuations. Likewise, the response signals from the transponder may be accumulated and averaged or integrated over one detection cycle or over multiple detection cycles. In particular, the number N of noise measurements or samples and/or the number M of response measurements or samples may be selected to achieve a desired ratio of N to M, in order to achieve or maintain a desired signal to noise ratio. For example, obtaining 400 noise measurements or samples and 1500 response measurements or samples each detection cycle results in an SNR of approximately 1.94 (e.g., 1.936 which is the square root of the 1500 divided by 400), which is almost 2:1. While an SNR of 1.1:1 may be sufficient in some embodiments, an SNR approaching 2:1 ensures sufficient differentiation to eliminate or reduce the possibility of false positives to an acceptable level for the particular applications envisioned herein. Any known hardware and software accumulators, summer, and/or integrators may be suitable.

Figure 9:
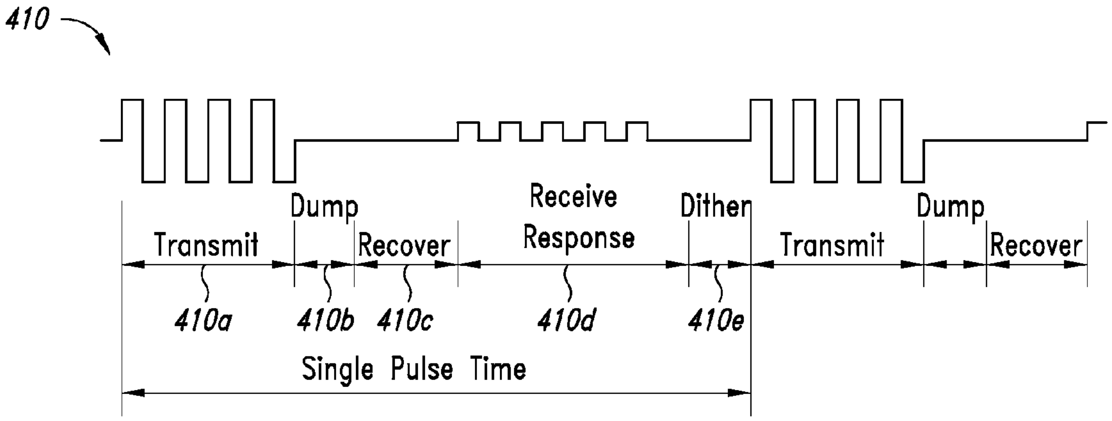
FIG. 9 is a timing diagram illustrating pulsed timing, according to one illustrated embodiment.

FIG. 9 illustrates pulse timing, according to one illustrated embodiment.

The custom logic in the FPGA 108 generates the timing and control signals for each pulse 410. During a transmit portion 410*a* of the pulse 410, the logic of the FPGA 108 drives the drive transistor control lines to generate the transmit signal. The FPGA logic controls the frequency of the transmit signal. During a dump portion 410*b* of the pulse 410, the logic of the FPGA 108 drives the gate of the dump TRIAC T1 to quickly drain the transmit energy from the antenna 22 in order to allow detection of the response signal form the transponder 26, if any. A recovery portion 410*c* of the pulse 410 allows receive filters and amplifiers to recover from the transmitted pulse before detecting the response signal from the transponder 26, if any. During the receive response portion 410*d* of the pulse 410, the FPGA 108 controls the signal ADC 128 to sample the response signal from the transponder 26, if any. The signal ADC 128 may, for example, sample at a 1 MHz sample rate with a 12-bit resolution. A dither portion 410*e* of the pulse 410 has a random variable length of time, and may, for example be generated by a pseudo-noise (PN) sequence generator. Adding a random length of time between pulses de-correlates the response signal received from the transponder 26 from constant frequency sources of interference, if any.

For example, within each of 150 millisecond measurement intervals discussed above, the custom logic of the FPGA 108 (FIG. 5) accumulates the received signals from 500 pulses.

Figure 10:
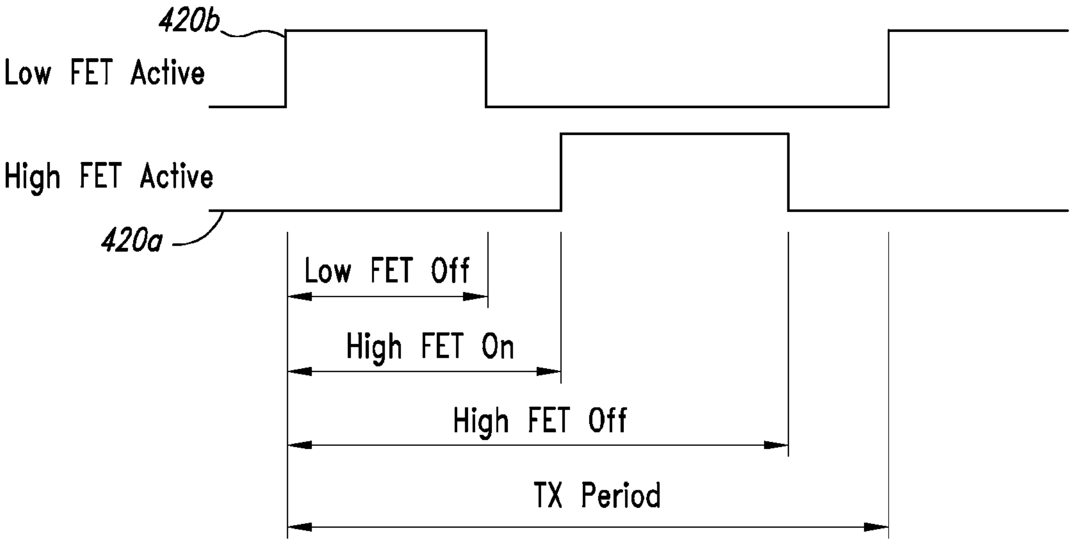
FIG. 10 is a timing diagram showing activation of a pair of transistors of the control circuit in a push-pull configuration to drive the antenna, according to one illustrated embodiment.

FIG. 10 shows signal timing for driving the drive transistors Q1, Q2 (FIG. 7A), according to one illustrated embodiment.

The custom logic in the FPGA 108 (FIG. 5) generates the signals 420*a*, 420*b* to drive the drive transistors Q1, Q2 (FIG. 7A) during the transmit portion 410*a* (FIG. 9) of the pulse 410. A transmit (TX) period value is used by the logic of the FPGA 108 to set the transmit frequency. The low transistor (e.g., Low FET) Q2 turns ON at the beginning of the transmit period. The Low FET off value controls when the low transistor (e.g., Low FET) Q2 is turned OFF. The low transistor Q2 is turned OFF before the high transistor (e.g., High FET) Q1 is turned ON to avoid a short circuit through the transistors Q1, Q2. The High FET on value controls when the high transistor (e.g., High FET) Q1 is turned ON. The High FET Off value controls when the high transistor Q1 is turned OFF. The high transistor is turned OFF before the low transistor Q2 is turned ON to avoid a short circuit through the transistors Q1, Q2. For example, to achieve a transmit frequency of 144.9 KHz, the transmit period should be set to 6.9 μsec. Also for example, a suitable duration that both the low and high transistors Q1, Q2 are OFF may be set to 400 nsec.

The ADC converts the signal received from the transponder 26, if any, from analog to digital. Such conversion may, for example, be performed at a sampling rate of 1 MHz with a 12-bit data resolution. The sampled ADC data is then accumulated together or integrated, for example over 1500 measurements or samples, to compute the total summed response signal received from the transponder 26, if any.

The accumulated or integrated received signal is match filtered with both in-phase and quadrature reference signals to determine the signal magnitude. The received receive signal is matched filtered with a plurality of reference signals, for example with the seven reference signals, for instance as shown in Table 1 below. Some embodiments, may employ match filtering before accumulating or integrating the received signal.

TABLE 1

| Match Frequency |
|---|
| 134 KHz |
| 139 KHz |
| 142 KHz |
| 145 KHz |
| 148 KHz |
| 151 KHz |
| 154 KHz |

The maximum value for the matched filters (e.g., seven matched filters) with active transmit is compared with an adjusted detection threshold. If the maximum value is greater than the detection threshold, then a response signal from a transponder 26 is considered as having been detected, and appropriate action is take, such as discussed below with reference to FIG. 17. Noise filtering is further discussed further below, with reference to FIG. 16.

Noise faults may be detected as well as wand transmit voltage faults. Noise faults may be detected when the matched filter output during the noise detection portion is greater than a noise fault threshold (e.g., 2.5 mV). Want transmit voltage faults may be detected when the wand transmit voltage drops below a wand voltage fault threshold (e.g., 270 $V_{Peak\text{-}to\text{-}Peak}$). Two environmental faults in a row such as the above, may trigger an Environmental Error Mode, while two normal measurements in a row may return to a normal Scan Mode. Faults in general are discussed in more detail below.

Figure 11:
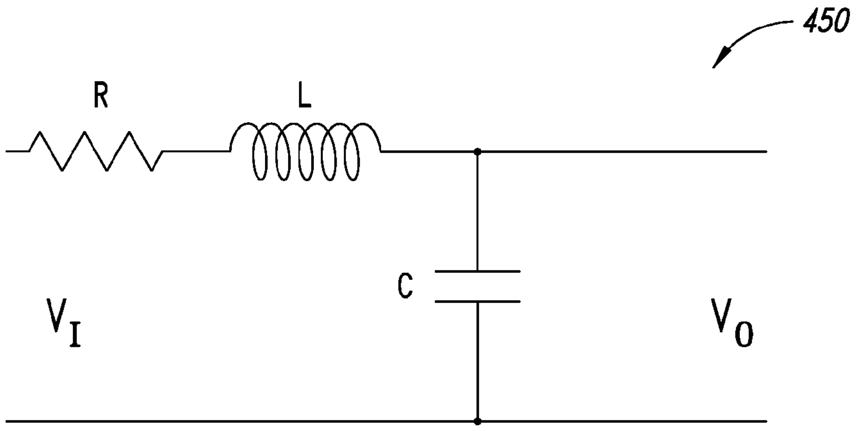
FIG. 11 is a schematic diagram of a model circuit that models how a transponder responds to the transmitted interrogation signals, according to one illustrated embodiment.

FIG. 11 shows a model circuit 450 that models how a transponder responds to the transmitted interrogation signals, according to one illustrated embodiment.

The model includes a resistance R in series with an inductance L on one voltage rail, and a capacitance C coupled across the voltage rails. An input voltage $V_I$ and an output voltage $V_O$ are produced across the voltage rails.

The Laplace transform for the transponder response model are represented by equations 1 and 2.

$$V_O(s) = H(s)V_I(s) \quad \text{Equation 1}$$

$$H(s) = \left(\frac{1}{LC}\right)\frac{1}{s^2 + \frac{R}{L}s + \frac{1}{LC}} \quad \text{Equation 2}$$

Using the Laplace equations, the transponder response output can be simulated for various input signals. The simulated and measured transponder responses are shown in FIGS. 12-15.

Figure 12:
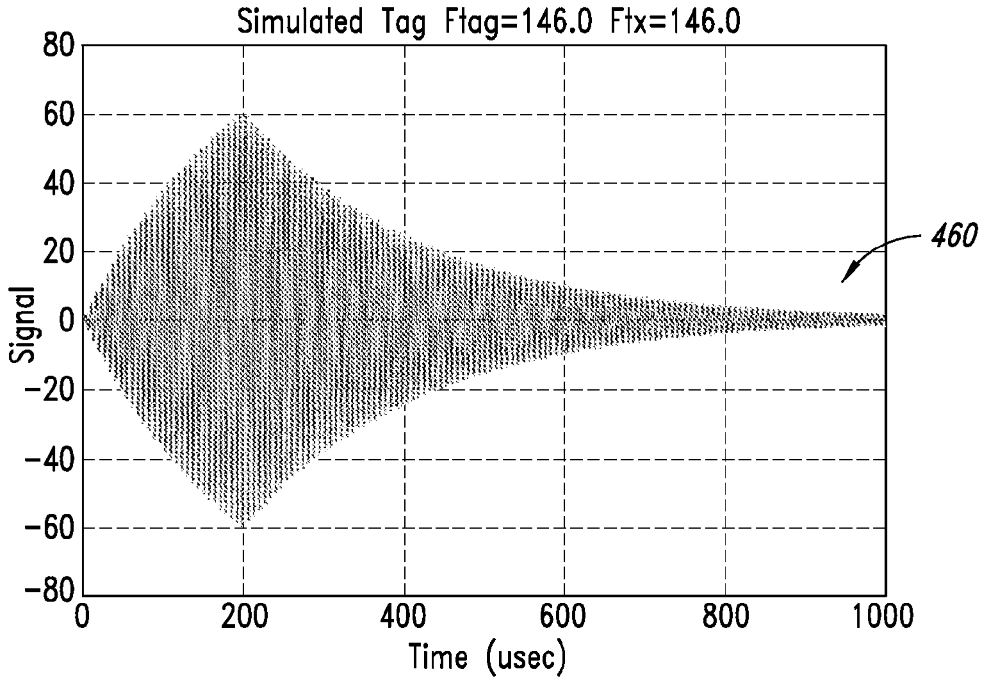
FIG. 12 is a graph of a simulated transponder response signal based on the model circuit of FIG. 11 where a frequency of the response signal matches a frequency of the interrogation signal, according to one illustrated embodiment.

FIG. 12 shows a graph of a simulated transponder response signal 460 based on the model circuit 450 (FIG. 11), according to one illustrated embodiment.

The simulated transponder response signal 460 is produced by the transponder in response to excitation by an interrogation signal. The simulated transponder response signal 460 represents a response by the transponder at the same frequency as the frequency of the interrogation signal (e.g., 146 KHz).

Figure 13:
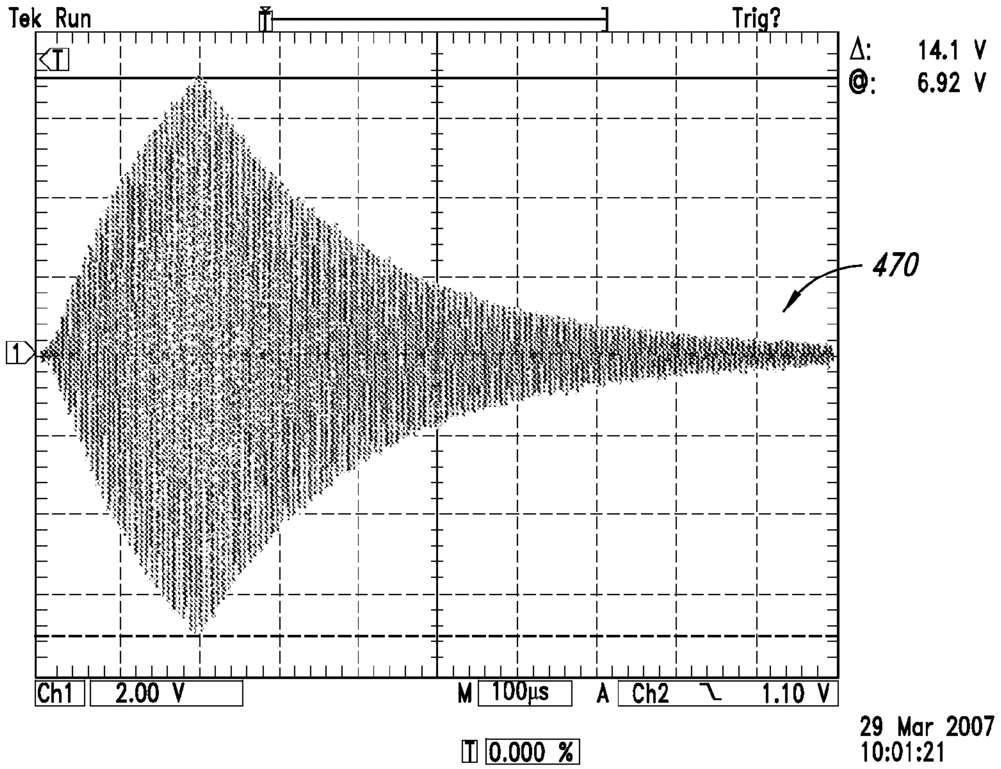
FIG. 13 is a graph of a measured transponder response signal where a frequency of the response signal matches a frequency of the interrogation signal, according to one illustrated embodiment.

FIG. 13 shows a graph of a measured transponder response signal 470, according to one illustrated embodiment.

The measured transponder response signal 470 is produced by the transponder in response to excitation by an interrogation signal. The measured transponder response signal 470 represents a response by the transponder at the same frequency as the frequency of the interrogation signal (e.g., 146 KHz).

Figure 14:
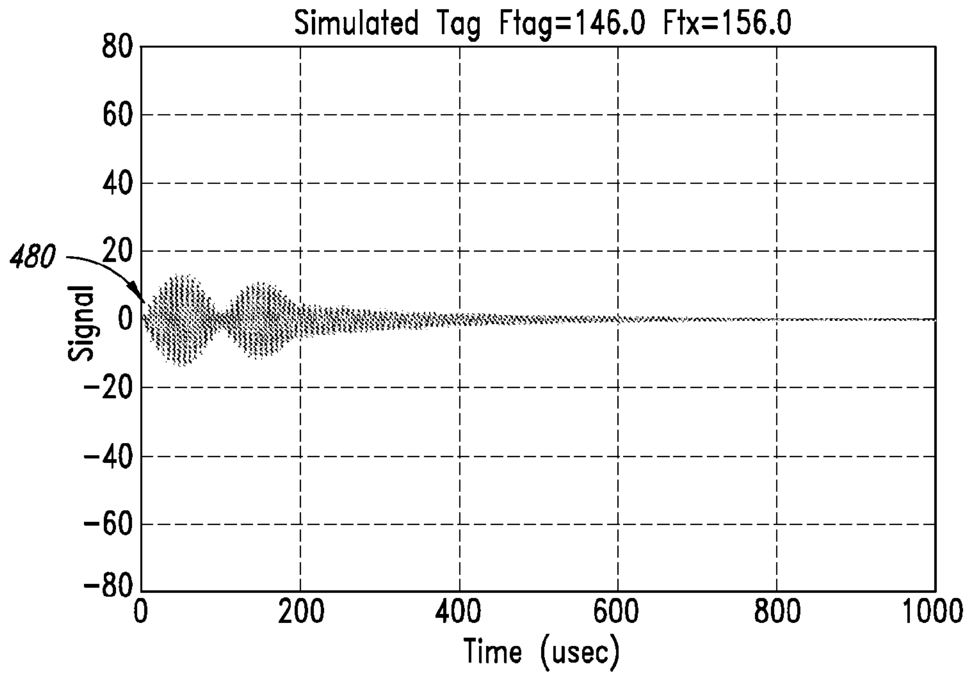
FIG. 14 is a graph of a simulated transponder response signal based on the model circuit of FIG. 11 where a frequency of the interrogation signal is higher than a frequency of the response signal, according to one illustrated embodiment.

FIG. 14 shows a graph of a simulated transponder response signal 480 based on the model circuit 450 (FIG. 11), according to one illustrated embodiment.

The simulated transponder response signal 480 is produced by the transponder in response to excitation by an interrogation signal. The simulated transponder response signal 480 represents a response by the transponder at a frequency (e.g., 146 KHz) to an interrogation signal that has a higher frequency (e.g., 156 KHz), for instance 10 KHz higher than the response signal.

Figure 15:
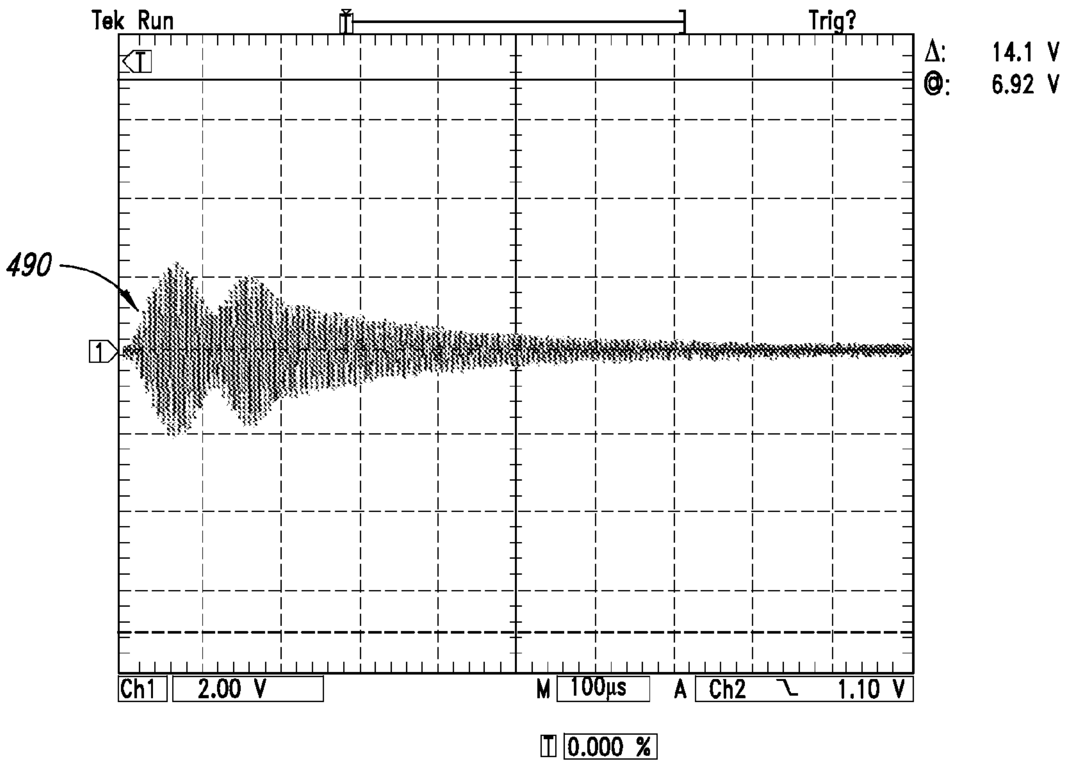
FIG. 15 is a graph of a measured transponder response signal where a frequency of the interrogation signal is higher than a frequency of the response signal, according to one illustrated embodiment.

FIG. 15 shows a graph of a measured transponder response signal 490, according to one illustrated embodiment.

The measured transponder response signal 490 is produced by the transponder in response to excitation by an interrogation signal. The measured transponder response signal 490 represents a response by the transponder at a frequency (e.g., 146 KHz) to an interrogation signal that has a higher frequency (e.g., 156 KHz), for instance 10 KHz higher than the response signal.

The similarity between the simulated transponder response signals 460, 480 and the measured transponder response signals 470, 490 demonstrates that there is a good match using the circuit model 450.

Figure 16:
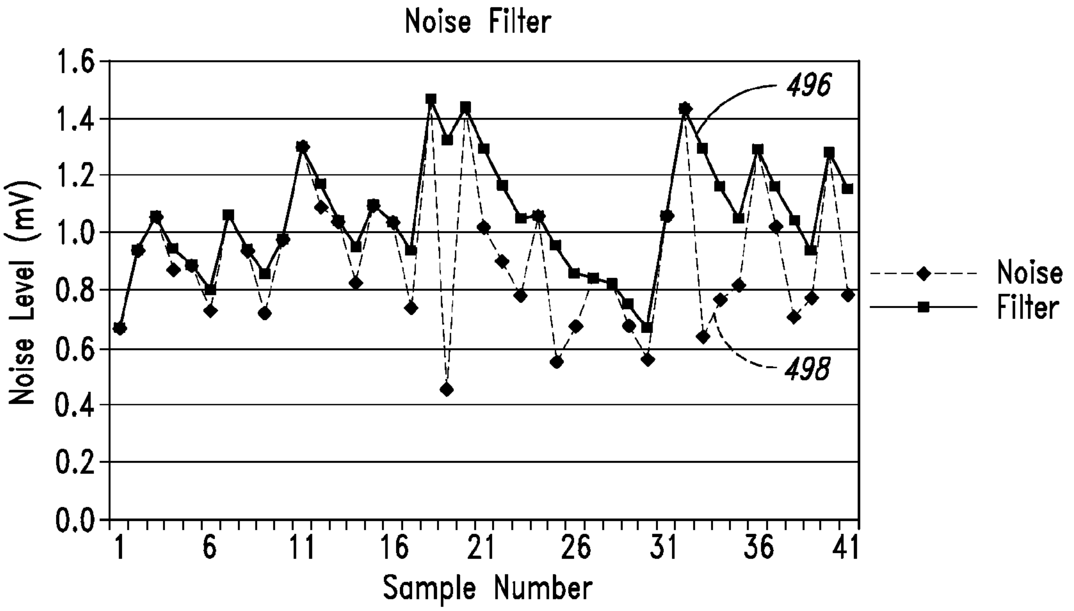
FIG. 16 is a graph showing noise and filter levels for noise filtering, according to one illustrative embodiment.

FIG. 16 is a graph showing an example of measured noise and the output of the noise filter corresponding to the measurements, according to one illustrative embodiment.

The noise filtering processes the measured or sampled noise values for each detection cycle to determine a stable noise floor value. The output of the noise filter is the maximum of either the current noise measurement or a decayed value of the previous nose floor.

The output of the noise filter is an estimate of the current noise floor level after averaging a plurality (e.g., 400) of noise measurements or samples. The number of response measurements or samples averaged to create the full signal may, for example, be 1500. Using the noise filter output as an adaptive detection threshold of the full signal provides an adaptive threshold that is estimated to be the square root of the quotient of 1500 divided by 400, or approximately 1.94 times the estimated noise floor level for the full signal. This provides almost twice the estimated noise floor. Performance in very low noise conditions may be stabilized by adding an additional factor of 0.5 mV to the adaptive threshold.

Figure 17:
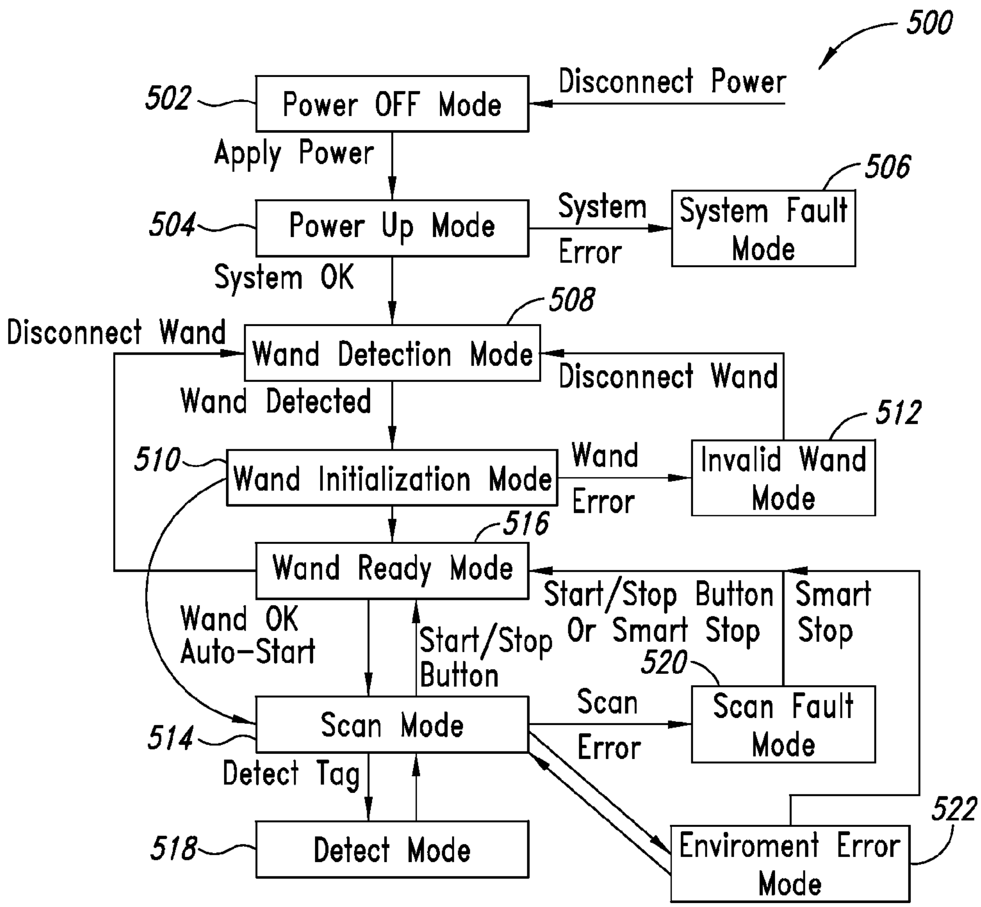
FIG. 17 is a flow diagram of a method of operating an interrogation and control system, according to one illustrated embodiment.

FIG. 17 shows a method 500 of operating the interrogation and detection system 14 according to one illustrated embodiment.

In response to detecting a disconnect of power, the interrogation and detection system 14 enters a Power OFF mode at 502. For example, the Power OFF mode 502 may be entered when the controller 20 (FIGS. 1 and 4) is unplugged or when the power switch on the controller 20 is turned OFF. In the Power OFF mode 502, the Power LED 134*a* and other front panel LEDs 134 will be turned OFF (non-emitting). The software 200 is inoperative in the Power OFF mode 502.

In response to detecting an application of power, the interrogation and detection system 14 enters a Power-Up mode 504. The Power UP mode 502 may, for example, in response to the application of power to the controller 20 and turning ON the switch on the back of the controller. In the Power-Up mode 504, a Power LED 134*a* may be turned ON or illuminated, and may remain ON or illuminated as long as the power is applied and the switch is in the ON state. In response to entering the Power UP mode 502, the software 200 will perform software initialization, built in tests, and an audio/visual test.

If a fault is detected, the software 200 progresses to a System Fault Mode 506. If no faults are detected, the software 200 may turn a System Ready LED green, and enter a Wand Detection Mode 508.

In the System Fault mode 506, the software 200 may cause an indication of the detection of a system fault by blinking a System Ready LED 134*b* yellow, and/or issuing a sequence of rapid beeps or other sounds. The corrective action for the System Fault Mode 506 is to cycle power to reinitiate the Power Up mode 504. Continued failure indicates a failed controller 20.

In the Wand Detection Mode 508, the software 200 checks for a wand 22*a* connected to the controller 20. The Wand Detection Mode 508 may be indicated by turning the System Ready LED 134*b* green and turning the Wand Ready LED 134*c* OFF. If no wand 22*a* is detected, the software 200 remains in the Wand Detection Mode. If a wand 22*a* is detected, the software 200 progresses to the Wand Initialization Mode 510.

At the start of the Wand Initialization Mode 510, after the detection of a wand 22*a*, the software 200 may turn the Wand Ready LED 134*c* yellow and check for the presence of a fuse in the wand 22*a*. If a fuse is found, the software 200 may attempt to blow the fuse and verify that the fuse was correctly blown. After the fuse is blown the software 200 may verify that wand 22*a* is operating within tolerances. The software 200 may indicate that the wand 22*a* is ready by turning the Wand Ready LED 134*c* green. The software 200 may also start a timer which will allow the wand 22*a* to be disconnected and reconnected to the controller for a period to time (e.g., 5 hours) after the fuse is blown.

The controller 20 may determine the adjustments or fine tuning to be made about the center frequencies or channels during Wand Initialization Mode 510. In particular, the controller 20 may determine the particular frequency in each of the frequency bands that elicits the response with the highest voltage. The controller may determine such be varying the capacitance of the LC circuit using the switched capacitors C33-C36 during the Wand Initialization Mode 510. The particular combination of switched capacitors C33-C36 which achieved the response with the highest voltage may then be automatically employed during the Scan Mode 514 (discussed below) to adjust or fine tune about the center frequency or channel in each broad band of transmission. Other approaches to determining the fine tuning may be employed.

If the software 200 does not successfully complete the Wand Initialization Mode 510, the software 200 enters an Invalid Wand Mode 512. If the software 200 successfully completes the Wand Initialization Mode 510, the software 200 progresses to the Scan Mode 514 to automatically start scanning.

In the Invalid Wand Mode 512, the software 200 may blink the Wand Ready LED 134*c* yellow and issues a slow beep pattern.

The Invalid Wand Mode may be entered in response to any of the following conditions:

- The wand 22*a* connected to the controller 20 is out of tolerance.
- The controller 20 is unable to blow the fuse in the wand 22*a*.
- The wand 22*a* does not have a fuse and more than the set time period has past (e.g., 5 hours) since a fuse was blown.
- The wand 22*a* does not have a fuse and the controller 20 has been restarted.
- The wand 22*a* has been connected to the controller for more than the set time period (e.g., 5 hours).
- The wand 22*a* is detuned due to close proximity to metal.

The corrective action for the Invalid Wand Mode 512 is to remove the invalid wand 22*a* and attach a new wand 22*a* to the controller 20 that contains a fuse or to reconnect the wand 22*a* while holding it in the air at least 2 feet away from large metallic objects.

The software 200 enters the Scan Mode 514 when the wand 22*a* is ready and the operator presses a Start/Stop button. The software 200 may issue a short three beep pattern via the speaker or beeper 130 when entering the Scan Mode 514 to identify the entry to the user.

In the Scan Mode 514, the software 200 may continuously or periodically perform the following functions.

- Look for response signals from transponders 26
- Monitor the noise level
- Insure the wand 22*a* is connected and operating correctly
- Blink the LED's in a circular pattern When the operator or user pushes the Start/Stop button or the a scan maximum time interval (e.g., 4 minute) has been reached, the software 200 may issue a short three beep pattern and return to the Wand Ready Mode 516.

When an appropriate response signal from a transponder 26 is detected while in Scan Mode 514, the software 200 may turn ON an amber DETECT LEDs 134*d* and/or provide an audible alarm. The alarm may, for example, beep a continuous solid tone as long as the transponder is detected, with a minimum of beep duration of, for instance 0.5 second.

If the software 200 detects the wand 22*a* is disconnected while in the Scan Mode 514, the software 200 enter the Scan Fault Mode 520. In the Scan Fault Mode 520, the software 200 may issue a sequence of rapid beeps and blink ON and OFF the amber DETECT LEDs 134*d*. The Scan Fault Mode 520 can be cleared by pushing the Start/Stop button. The software 200 will automatically clear the scan fault mode 520 after 10 beeps.

While in the Scan Mode 514, if excess noise or loss of transmit signal is detected, the software 200 will progress to the Environment Error Mode 522. In the Environment Error Mode 522, the software 200 may issue or produce an appropriate indication. For example, the software 200 may cause the production of a sequence of slow beeps and the blinking ON and OFF the green circle LEDs 134*e*. The corrective action for the Environment Error Mode 522 is to reposition the wand 22*a* away from large metal objects or sources of electrical interference. The software 200 will automatically stop the scan if the environment error condition lasts for more than a set time or number of beeps (e.g., 5 beeps).

The above description of illustrated embodiments, particularly the pulsed wide band frequency hopping with dynamic adjustment of the transmission frequency in the various frequency bands and the use of switched capacitors to achieve such, advantageously permit the use of inexpensive transponders which are not accurately tuned to a chosen or selected resonant frequency. This is in marked contrast to the approach typically taken with other types of resonant transponders (i.e., transponders without memory). Such approaches typically interrogate or excite the resonant transponder using narrow frequency bands centered closely on specific frequencies, to achieve a selected resonant response from a highly accurate transponder in order to differentiate signal from noise. This is also in marked contrast to the approach typically taken with radio frequency identification (RFID) tags whether active or passive, which also typically employ are narrow band to achieve a selected response from a highly accurate RFID tag.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other transponders and interrogation and detection systems, not necessarily the exemplary surgical object transponders and interrogation and detection systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/811,376 filed Jun. 6, 2006; U.S. Pat. No. 6,026,818, issued Feb. 22, 2000; U.S. Patent Publication No. US 2004/0250819, published Dec. 16, 2004; and U.S. provisional patent application Ser. No. 60/811,376, filed Jun. 6, 2006, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a transponder detection device, the method comprising:

during each of a plurality of detection cycles, receiving electromagnetic signals during a noise detection portion of the detection cycle;

determining a value indicative of a noise level based at least in part on the electromagnetic signals received during the noise detection portion of the detection cycle;

adjusting a detection threshold based at least in part on at least one determined value indicative of the noise level;

emitting at least one electromagnetic interrogation signal during a transmit portion of the detection cycle;

receiving electromagnetic signals during a receive response portion of the detection cycle that follows the transmit portion of the detection cycle; and determining the presence or absence of a transponder based at least in part on the electromagnetic signals received during the detection cycle and the adjusted detection threshold, wherein determining a value indicative of a noise level based at least in part on the electromagnetic signals received during the noise detection portion of the detection cycle includes averaging the values indicative of the noise level over each of the detection cycles, and wherein adjusting a detection threshold based at least in part on the determined value indicative of the noise level includes adjusting the detection threshold based at least in part on an average of the values indicative of the noise levels over multiple samples or measurements of at least one of the detection cycles, wherein averaging a sufficient number of the values indicative of the noise level over each of the detection cycles includes averaging the values indicative of the noise level over each of the detection cycles sufficient to provide a signal to noise ratio greater than approximately 1.93.

2. The method of claim 1, further comprising:

ignoring any electromagnetic signals received during a recovery portion of the detection cycle that precedes the receive response portion of the detection cycle.

3. The method of claim 1, further comprising:

dumping energy from an antenna circuit during a dump portion of the detection cycle that precedes the recovery portion of the detection cycle.

4. The method of claim 1, further comprising:

for each successive pair of detection cycles, varying a time between a start of a first one of the successive pairs of the detection cycles and a start of a next successive one of the pairs of the detection cycles.

5. The method of claim 1 wherein the transmit and the receive response portions each occur during an interrogation portion of the detection cycle, which follows the noise detection portion of the detection cycle.

6. The method of claim 1 wherein emitting at least one electromagnetic interrogation signal during a transmit portion of the detection cycle includes emitting at least one wide band electromagnetic interrogation signal.

7. The method of claim 1 wherein emitting at least one electromagnetic interrogation signal during a transmit portion of the detection cycle includes emitting a first wide band electromagnetic interrogation signal during a first transmit portion of the detection cycle and emitting at least a second wide band electromagnetic interrogation signal during a second transmit portion of the detection cycle.

8. The method of claim 1 wherein emitting at least one electromagnetic interrogation signal during a transmit portion of the detection cycle includes emitting a first wide band electromagnetic interrogation signal centered about a first center frequency during a first transmit portion of the detection cycle and emitting a second wide band electromagnetic interrogation signal centered about a second center frequency during a second transmit portion of the detection cycle, the second center frequency different than the first center frequency.

9. The method of claim 1 wherein emitting at least one electromagnetic interrogation signal during a transmit portion of the detection cycle includes emitting a first wide band electromagnetic interrogation signal centered about a first center frequency and emitting a second wide band electromagnetic interrogation signal centered about the first center frequency.

10. A method of operation of a transponder detection device, the method comprising:

during each of a plurality of detection cycles, receiving electromagnetic signals during a noise detection portion of the detection cycle;

determining a value indicative of a noise level based at least in part on the electromagnetic signals received during the noise detection portion of the detection cycle;

adjusting a detection threshold based at least in part on at least one determined value indicative of the noise level;

emitting at least one electromagnetic interrogation signal during a transmit portion of the detection cycle;

receiving electromagnetic signals during a receive response portion of the detection cycle that follows the transmit portion of the detection cycle; and determining the presence or absence of a transponder based at least in part on the electromagnetic signals received during the detection cycle and the adjusted detection threshold, wherein determining a value indicative of a noise level based at least in part on the electromagnetic signals received during the noise detection portion of the detection cycle includes averaging the values indicative of the noise level over each of the detection cycles, and wherein adjusting a detection threshold based at least in part on at least one determined value indicative of the noise level includes adjusting the detection threshold based at least in part on a number N of noise measurements or samples, and determining the presence or absence of a transponder based at least in part on the electromagnetic signals received during the detection cycle and the adjusted detection threshold includes determining the presence or absence of the transponder based at least in part on a number M of response measurements or samples received an interrogation portion of the detection cycle, wherein a square root of a ratio of M/N is equal or greater than approximately 1.93.

11. A method of operation of a transponder detection device, the method comprising:

during each of a plurality of detection cycles, receiving electromagnetic signals during a noise detection portion of the detection cycle;

determining a value indicative of a noise level based at least in part on the electromagnetic signals received during the noise detection portion of the detection cycle;

adjusting a detection threshold based at least in part on at least one determined value indicative of the noise level;

emitting at least one electromagnetic interrogation signal during a transmit portion of the detection cycle;

receiving electromagnetic signals during a receive response portion of the detection cycle that follows the transmit portion of the detection cycle; and determining the presence or absence of a transponder based at least in part on the electromagnetic signals received during the detection cycle and the adjusted detection threshold, wherein determining a value indicative of a noise level based at least in part on the electromagnetic signals received during the noise detection portion of the detection cycle includes averaging the values indicative of the noise level over each of the detection cycles, and wherein adjusting a detection threshold based at least in part on at least one determined value indicative of the noise level includes adjusting the detection threshold based at least in part on a number N of noise measurements or samples, and determining the presence or absence of a transponder based at least in part on the electromagnetic signals received during the detection cycle and the adjusted detection threshold includes determining the presence or absence of the transponder based at least in part on a number M of response measurements or samples received an interrogation portion of the detection cycle, wherein a square root of a ratio of M is equal or greater than approximately 1.1.

12. The method of claim 1 wherein determining the presence or absence of a transponder based at least in part on the received electromagnetic signals and the adjusted detection threshold includes match filtering an accumulated response signal with at least one in-phase reference signal and at least one quadrature reference signal to determine a magnitude of the accumulated response signal, where the accumulated response signal is indicative of the electromagnetic signals received during the receive response portion of at least two of the detection cycles.

13. A method of operation of a transponder detection device, the method comprising:

during each of a plurality of detection cycles, receiving electromagnetic signals during a noise detection portion of the detection cycle;

determining a value indicative of a noise level based at least in part on the electromagnetic signals received during the noise detection portion of the detection cycle;

adjusting a detection threshold based at least in part on at least one determined value indicative of the noise level;

emitting at least one electromagnetic interrogation signal during a transmit portion of the detection cycle;

receiving electromagnetic signals during a receive response portion of the detection cycle that follows the transmit portion of the detection cycle;

determining the presence or absence of a transponder based at least in part on the electromagnetic signals received during the detection cycle and the adjusted detection threshold, wherein determining a value indicative of a noise level based at least in part on the electromagnetic signals received during the noise detection portion of the detection cycle includes averaging the values indicative of the noise level over each of the detection cycles;

accumulating the electromagnetic signals received during the noise detection portion of at least two of the detection cycles into an accumulated noise signal;

comparing the accumulated noise signal against an ambient noise threshold; and taking a fault action if the accumulated noise signal exceeds the ambient noise threshold.

14. The method of claim 1, further comprising:

comparing a transmit voltage to a transmit voltage threshold; and taking a fault action if the transmit voltage is below the transmit voltage threshold.

15. A transponder detection system, comprising:

transmitting means for transmitting electromagnetic interrogation signals during at least one transmit portion of each of a plurality of detection cycles;

receiving means for receiving electromagnetic signals during a noise detection portion and a receive response portion of each of the detection cycles;

noise level determination means for determining a noise level during the noise detection portion of the detection cycles, the noise detection portion temporally spaced from the transmit portions such that transponders are not responding to the electromagnetic interrogation signals;

detection threshold adjustment means for adjusting a detection threshold of the transponder detection system based at least in part on at least one value indicative of at least one of the noise levels, wherein the at least one value is at least one of an average or an integration of the determined noise levels over multiple samples or measurements of at least one of the detection cycles;

means for determining the presence or absence of the transponders based at least in part on the received electromagnetic signals and the adjusted detection threshold;

recovery means for ignoring any electromagnetic signals received during a recovery portion of the detection cycle that precedes the receive response portion of the detection cycle;

dumping means for dumping energy from an antenna circuit during a dump portion of the detection cycle that precedes the recovery portion of the detection cycle; and dithering means for varying a time between a start of a first one of the successive pairs of the detection cycles and a start of a next successive one of the pairs of the detection cycles.

16. The transponder detection system of claim 15, further comprising:

averaging means for movingly averaging a plurality of the determined noise levels over the plurality of detection cycles, and wherein the detection threshold adjusting means adjusts the detection threshold based at least in part on the determined noise level includes adjusting the detection threshold based at least in part on the average of the determined noise levels over multiple samples or measurements of at least one of the detection cycles.

17. The transponder detection system of claim 15 wherein the transmitting means includes frequency adjustment means adjusting a center frequency of the electromagnetic interrogation signals between successive transmit portions of the detection cycle.

18. A transponder detection system, comprising:

transmitting means for transmitting electromagnetic interrogation signals during at least one transmit portion of each of a plurality of detection cycles;

receiving means for receiving electromagnetic signals during a noise detection portion and a receive response portion of each of the detection cycles;

noise level determination means for determining a noise level during the noise detection portion of the detection cycles, the noise detection portion temporally spaced from the transmit portions such that transponders are not responding to the electromagnetic interrogation signals;

detection threshold adjustment means for adjusting a detection threshold of the transponder detection system based at least in part on at least one value indicative of at least one of the noise levels, wherein the at least one value is at least one of an average or an integration of the determined noise levels over multiple samples or measurements of at least one of the detection cycles; and means for determining the presence or absence of the transponders based at least in part on the received electromagnetic signals and the adjusted detection threshold, wherein the nose level determination means captures a number N of noise measurements or samples are captured during the noise detection portion of the detection cycles and wherein the transponder detection system captures a number M of response measurements or samples during an interrogation portion of the detection cycle and a square root of a ratio of M/N is at least equal to approximately 1.93.

19. A transponder detection system, comprising:

transmitting means for transmitting electromagnetic interrogation signals during at least one transmit portion of each of a plurality of detection cycles;

receiving means for receiving electromagnetic signals during a noise detection portion and a receive response portion of each of the detection cycles;

noise level determination means for determining a noise level during the noise detection portion of the detection cycles, the noise detection portion temporally spaced from the transmit portions such that transponders are not responding to the electromagnetic interrogation signals;

detection threshold adjustment means for adjusting a detection threshold of the transponder detection system based at least in part on at least one value indicative of at least one of the noise levels, wherein the at least one value is at least one of an average or an integration of the determined noise levels over multiple samples or measurements of at least one of the detection cycles; and means for determining the presence or absence of the transponders based at least in part on the received electromagnetic signals and the adjusted detection threshold, wherein the nose level determination means captures a number N of noise measurements or samples are captured during the noise detection portion of the detection cycles and wherein the transponder detection system captures a number M of response measurements or samples during an interrogation portion of the detection cycle and a square root of a ratio of M/N is equal to or greater than approximately 1.1.

20. A transponder detection system, comprising:

a receiver configured to receive electromagnetic signals during a noise detection portion and at least one receive response portion of each of a plurality of detection cycles;

a transmitter configured to transmit at least one electromagnetic interrogation signal during at least one transmit portion of each of the detection cycles;

a controller configured to adjust a detection threshold of the transponder detection system based at least in part on at least one determined value indicative of a noise level and to determine whether the electromagnetic signals received during the at least one receive response portion of the detection cycles were received from a transponder in response to the electromagnetic interrogation signals based at least in part on the adjusted detection threshold, wherein the controller is configured to employ a number N of noise measurements or samples captured during the noise detection portion of the detection cycles and a number M of response measurements or samples captured during an interrogation portion of the detection cycle, and a square root of a ratio of M/N is at least equal to approximately 1.93.

21. The transponder detection system of claim 20 wherein the controller is further configured adjust the detection threshold based at least in part on an average or an integration of the determined noise levels over multiple samples or measurements of at least one of the detection cycles.

22. The transponder detection system of claim 20 wherein the controller is further configured to movingly average a plurality of determined noise levels over at least two of detection cycles, and to adjust the detection threshold based at least in part on the average of the determined noise levels over multiple samples or measurements of at least one of the detection cycles.

23. The transponder detection system of claim 20 wherein the controller is further configured to determine a noise level value indicative of a noise level based at least in part of the electromagnetic signals received during the noise detection portion of the detection cycles.

24. The transponder detection system of claim 20 wherein the controller is further configured to ignore any electromagnetic signals received during a recovery portion of the detection cycles that precedes the receive response portion of the detection cycles, and to dump energy from an antenna circuit during a dump portion of the detection cycles that precedes the recovery portion of the detection cycles.

25. The transponder detection system of claim 20 wherein the controller is further configured to vary a time between a start of a first one of a successive pair of the detection cycles and a start of a next successive one of the pair of the detection cycles, for each successive pair of detection cycles.

26. The transponder detection system of claim 20 wherein the controller is further configured to adjust a frequency of the electromagnetic interrogation signals during at least two transmit portions during each of the detection cycles.

27. The transponder detection system of claim 20 wherein the square root of the ratio of M/N is at least equal to approximately 1.1.

28. The transponder detection system of claim 20, further comprising:

an antenna removably coupled to a transmission line to form a low Q tuned LC circuit with the number of switch capacitors.

29. The transponder detection system of claim 20 wherein the controller is further configured to determine a presence or absence of a transponder by match filtering an accumulated response signal with at least one in-phase reference signal and at least one quadrature reference signal to determine a magnitude of the accumulated response signal, where the accumulated response signal is indicative of the electromagnetic signals received during the receive response portion of at least two of the detection cycles.

30. The transponder detection system of claim 24 wherein the controller is further configured to accumulate the electromagnetic signals received during the noise detection portion of at least two of the detection cycles into an accumulated noise signal, compare the accumulated noise signal against an ambient noise threshold, and take a fault action if the accumulated noise signal exceeds the ambient noise threshold.

31. The transponder detection system of claim 20 wherein the controller is further configured to compare a transmit voltage to a transmit voltage threshold, and take a fault action if the transmit voltage is below the transmit voltage threshold.

* * * * *

UNITED STATES PATENT AND TRADEMARK OFFICE

CERTIFICATE OF CORRECTION

PATENT NO. : 7,696,877 B2
APPLICATION NO. : 11/743104
DATED : April 13, 2010
INVENTOR(S) : Bruce E. Barnes et al.

It is certified that error appears in the above-identified patent and that said Letters Patent is hereby corrected as shown below:

Column 21, Line 63
"root of a ratio of M is equal or greater than approximately 1.1" should read -- root of a ratio of M/N is equal or greater than approximately 1.1 --.

Column 26, Line 8
"30. The transponder detection system of claim 24 wherein" should read -- 30. The transponder detection system of claim 20 wherein --.

Signed and Sealed this

Ninth Day of November, 2010

David J. Kappos
*Director of the United States Patent and Trademark Office*